(12) United States Patent
Kolluru et al.

(10) Patent No.: US 6,430,533 B1
(45) Date of Patent: Aug. 6, 2002

(54) AUDIO DECODER CORE MPEG-1/MPEG-2/ AC-3 FUNCTIONAL ALGORITHM PARTITIONING AND IMPLEMENTATION

(75) Inventors: Mahadev S. Kolluru, Santa Clara; Satish S. Soman, Cupertino, both of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/062,344

(22) Filed: Apr. 17, 1998

Related U.S. Application Data

(63) Continuation-in-part of application No. 08/642,520, filed on May 3, 1996.

(51) Int. Cl.[7] .............................................. G10L 19/00
(52) U.S. Cl. ....................................... 704/500; 704/501
(58) Field of Search .................................. 704/500–504

(56) References Cited

U.S. PATENT DOCUMENTS

| | | |
|---|---|---|
| 5,126,726 A | 6/1992 | Howard et al. |
| 5,448,310 A | 9/1995 | Kopet et al. |
| 5,473,631 A | 12/1995 | Moses |
| 5,515,107 A | 5/1996 | Chiang et al. |
| 5,576,765 A | 11/1996 | Cheney et al. |
| 5,576,958 A | 11/1996 | Kawakatsu et al. |
| 5,594,789 A | 1/1997 | Seaholtz et al. |
| 5,623,311 A | 4/1997 | Phillips et al. |
| 5,635,985 A | 6/1997 | Boyce et al. |
| 5,638,128 A | 6/1997 | Hoogenboom et al. |

OTHER PUBLICATIONS

Tsai et al ("An MPEG Decoder Chip", IEEE, Nov. 7, 1994).*
Li et al ("An AC–3/MPEG Multi–standard Audio Decoder IC"), 1997.*
Maturi (Single Chip MPEG Audio Decoder, IEEE, Jun. 5, 1992).*
Lee et al, "A Parser Processor for MPEG–2 Audio and AC–3 Decoding", 1997 IEEE International Symposium on Circuits and Systems,Jun. 1997.*
Ko et al, "A VLSI Implementation of Dual AC–3 and MPEG–2 Audio Decoder", IEEE Transactions, vol. 44 #3, Mar. 1998.*
Lau et al, "A Common transform Engine for MPEG & AC3 Audio Decoder", IEEE Transactions on Consumer Electronics, vol. 43 No. 3, Jun. 13, 1997.*

(List continued on next page.)

Primary Examiner—Richemond Dorvil
Assistant Examiner—Michael N. Opsasnick
(74) Attorney, Agent, or Firm—Christopher P. Maiorana PC

(57) ABSTRACT

A digital audio decoder is described. The digital audio decoder includes: (i) an audio core which defines a hardware for sub-band synthesis and windowing during decoding of MPEG and AC-3 digital audio signals; (ii) an input RAM coupled to the audio core and configured to store discrete samples in preparation for the sub-band synthesis and the windowing and configured to store intermediate values that are calculated by the audio core during the sub-band synthesis and written back to the input RAM.

A process of decoding MPEG and AC-3 digital audio signals is also described. The process includes: (i) providing a digital audio decoder including firmware and hardware that are configured to decode MPEG or AC-3 digital audio signals; (ii) receiving MPEG or AC-3 encoded digital audio signals; (iii) decoding at least partially the digital audio signals by the firmware using MPEG or AC-3 audio algorithms that precede sub-band synthesis and windowing; and (iv) performing the sub-band synthesis and the windowing on MPEG or AC-3 digital audio signals by the hardware, wherein for a period of time the decoding of the digital audio signals by the firmware and performing the sub-band synthesis and the windowing by the hardware are carried out simultaneously.

21 Claims, 14 Drawing Sheets

OTHER PUBLICATIONS

Jhung et al, "Architecture of Dual Mode Audio Filter for AC3 and MPEG", IEEE Transactions on Consumer Electronics; vol. 43, No. 3, Jun. 13, 1997.*

Martin Boliek, "*Real–Time Discrete Cosine Transform Chip Using Generalized Chen Transform Technology,*" pp. 428–431, Ricoh California Research Center, Menlo Park, CA.

Unknown, "*Digital Audio Compression (AC–3),*" T3 review copy of draft ATSC audio standard, Aug. 12, 1994, Doc. T3/251.

Unknown, "*Information Technology–Generic Coding of Moving Pictures and Associated Audio Information: Video,*" ISO/IEC 13818–2, Draft International Standard, Nov. 9, 1994.

Unknown, "*Coding of Moving Pictures and Associated Audio,*" ISO/IEC 13818–3, International Standard, Nov. 11, 1994.

Dave Bursky, "*Single Chip Performs Both Audio and Video Decoding,*" Electronic Design, Apr. 3, 1995.

Unknown, "*Coding of Moving Pictures and Associated Audio for Digital Storage Media At Up To About 1.5 MBIT/s,*" 3–11171 rev. 1, (Part 3 Audio), May 30, 1995.

International Organisation for Standardisation Organisation Internationale De Normalisation ISO/IEC JTC1/SC29/WG11 Coding of Moving Pictures and Audio, "*Information Technology—Generic Coding of Moving Pictures and Audio: Audio ISO/IEC 13818–3*", Second Addition, Feb. 20, 1997.

Advanced Television Systems Committee, "*Digital Audio Compression Standard (AC–3)*", Dec. 20, 1995.

* cited by examiner

AUDIO DECODER CORE MPEG-1/MPEG-2/AC-3 FUNCTIONAL ALGORITHM PARTITIONING AND IMPLEMENTATION

CROSS REFERENCE TO RELATED APPLICATIONS

This application is a continuation in part of U.S. patent application Ser. No. 08/642,520 filed on May 3, 1996 and naming Srinivasa R. Malladi and Mahadev S. Kolluru as inventors. That application is incorporated herein by reference for all purposes.

BACKGROUND OF THE INVENTION

The present invention relates to decoding and reconstruction of two channel MPEG-1 and/or multi-channel MPEG-2/AC-3 audio data. More specifically, the invention relates to decoding and reconstruction of audio data by performing a functional partitioning of the MPEG-1, MPEG-2 and AC-3 audio decoding algorithms, which partitioning allocates some of the decoding steps to be done in hardware and the remaining tasks to be done in firmware.

Various standards have been developed for the purpose of providing digitally encoded audio data that can be reconstructed to provide good quality audio playback. In the late 1980s, a digital audio/video reconstruction standard known as "MPEG" (for Motion Pictures Experts Group) was promulgated by the International Standards Organization (ISO). MPEG syntax provides an efficient way to represent audio and video sequences in the form of compact coded data. MPEG unambiguously defines the form of a compressed bit stream generated for digital audio/video data. Given the knowledge of the MPEG rules, one can thus design a decoder which reconstructs an audio/video sequence from the compressed bit stream.

MPEG was initiated in the early 1990s to define a syntax for higher quality audio playback for broadcast video. The MPEG-1 audio standard is described in a document entitled "Coding of Moving Pictures and Associated Audio for Digital Storage Media at up to about 1.5 MBit/s" (Part 3 Audio) 3-11171 rev 1 (1995) (hereinafter "the MPEG-1 Document"). The MPEG-2 audio standard is described in a document entitled "Generic Coding of Moving Pictures and Associated Audio Information" ISO/IEC 13818-3 (1994) (hereinafter "the MPEG-2 Document"). Both standards documents are incorporated herein by reference for all purposes. Both documents are available from ISO/IEC Case Postale 56, CH-1211, Geneva 20, Switzerland.

A competing standard employing Dolby® processing and known as "AC-3" has also been developed by the United States Advanced Television Systems Committee for digital encoding and decoding of audio data. This standard is described in the "Digital Audio Compression (AC-3)" draft ATSC STANDARD" AC3STD68.DOC (1994) (hereinafter "the AC-3 Document") which is available from Dolby Laboratories, Inc. located in San Francisco, Calif. and is incorporated herein by reference for all purposes.

The MPEG-2 audio decoding algorithm requires certain steps such as decoding of bit allocation, decoding of scale factors, variable length decoding of audio samples, requantization of samples, inverse discrete cosine transform matrixing, and windowing. The AC-3 audio decoding algorithm requires certain steps such as bit allocation, dequantization, decoupling, rematrixing, dynamic range compression, inverse fast fourier transform, and windowing and de-interleaving.

By way of example, audio decoder solutions like Six Channel Dolby Digital Surround Processor, Two Channel Dolby AC-3/MPEG-1 Audio Decoder, Programmable Dolby Digital AC-3/MPEG-2 Processor available from Zoran Corporation of Santa Clara, Calif. 6 Channel Audio Decoder IC, available from Thompson Multimedia of Hannover, Germany, and other products available from Compcore, USA and Aureal Inc, USA offer a purely software design or a purely hardware design. These designs, however, fail to offer the capability of decoding multi-channel audio and reconstruct a programmable number of output audio channels (specified by a customer) at a low system clock.

While CPU digital processing power has improved markedly in recent years, the purely software/firmware implementation alone cannot effectively decode the sheer volume of encoded audio data that must be rapidly decompressed and played back when decoding multi-channel MPEG-1, MPEG-2 or AC-3 audio data. CPUs like SPARC from Sun Microsystems, Inc. of Mountain View, Calif., MIPS from Silicon Graphics, Inc. of Mountain View, Calif., Pentium from Intel Corporation of Santa Clara, Calif., etc. cannot, in themselves, handle MPEG-2 audio decoding because they cannot meet the multi-channel audio frame decode time requirements at low system clock frequencies. Current designs described above decode AC-3 multi-channel audio data at a higher system clock and therefore require higher-power consumption. Furthermore, fully software/firmware-based audio decoders require large sized Code ROMs to achieve the decoding functionality, and are expensive.

A complete hardware implementation, which may employ a multiplier, for example, comes at the expense of large number of transistor device gates that consume a large chip area.

Thus, it would be desirable to find a way to perform a functional partitioning of the MPEG-1, MPEG-2 and AC-3 audio decoding algorithms such that the partitioning allocates some of the decoding steps to be done in hardware and the remaining tasks to be done in firmware.

SUMMARY OF THE INVENTION

The present invention provides a reusable hardware layout ("core") for performing some, but not all, MPEG and AC-3 audio decoding functions. The functional blocks comprising this "audio core" define a unique hardware architecture which can be used with additional hardware or software for performing those MPEG and AC-3 audio decoding functions not performed by the audio core.

Hereinafter, except where distinctions between the two versions of the MPEG standard exist, the terms "MPEG-1" and "MPEG-2" will be used interchangeably to reference those audio decoding algorithms promulgated in the original MPEG-1 Document as well as in the MPEG-2 Document, and any future versions of MPEG decoding. Likewise, the term "AC-3" is intended to refer to not only the current AC-3 standard, but any other versions of this standard that exist now or are developed in the future.

A chip designer may use the audio core of this invention to expedite the designing of an MPEG or AC-3 audio decoder. However, because the audio core of this invention performs only some of the MPEG and AC-3 decoding steps, the designer is free to design blocks, optimized for the designer's purposes, to perform the remaining MPEG and/or AC-3 functions. The audio core of this invention is particularly useful for expeditiously designing "system" chips containing multiple cores on a single chip. Such cores might include, for example, the audio core of this invention, a video core, and a CPU core.

A significant benefit of an audio core derives from its availability for repeated use in many different chips for different applications. In each such chip, the audio decoding functions specified by the audio core can be employed without redesign. Thus, the audio core may be used on a first integrated circuit having a first integrated circuit design and on a second integrated circuit having a second integrated circuit design, with the first and second integrated circuit designs having at least some features not in common. If a system chip is employed, the first integrated circuit design may include a first collection of cores, while the second integrated circuit may include a second collection of cores, etc.—even though the first and second collections of cores have at least one core not in common.

The audio core design itself is preferably stored on a machine readable media such as a magnetic or optical storage unit. The information content of the core preferably includes a series of hardware layouts specifying the locations and features of various circuit elements comprising the audio core architecture. Ultimately, the audio core design is implemented as hardware on one or more chips. Thus, the audio core design exists as both an intangible description of hardware and as the actual hardware itself.

In a preferred embodiment, the audio decoder core design specifies that at least the following MPEG and AC-3 functions are performed by the hardware: sub-band synthesis (or "matrixing"), downmixing and windowing. These functions are detailed in the MPEG Document and the AC-3 Document (as "Transformation Equations"). In especially preferred embodiments, other MPEG-2 and AC-3 functions such as bit allocation decoding, scale factor decoding, variable length decoding, requantization, decoupling, rematrixing, and dynamic range compression are not performed by the audio core of this invention.

The present invention provides an audio core design having a data path for performing some functions (usually matrixing and windowing) of both MPEG audio decoding and AC-3 audio decoding. From a structural perspective, the data path should include at least one multiplier and at least one accumulator. Other architecturally distinct logical blocks of the audio core may be a control logic unit, an input RAM interface (for controlling an input RAM or controlling a samples input RAM and an intermediate values input RAM), an output RAM interface (for controlling an output RAM), a ROM, a ROM addressing logic unit, and a registers interface. The input RAM or samples input RAM and intermediate values input RAM and the output RAM are preferably located outside of the audio core.

Preferably, the control logic unit specifies in which state of multiple states the audio core currently resides, with each of the multiple states specifying one function or group of functions of either the MPEG or AC-3 decoding process. The control logic unit includes an MPEG state machine for generating MPEG state and cycle count information and an AC-3 state machine for generating AC-3 state and cycle count information. This information is employed by the RAM and ROM addressing logic to specify appropriate addresses for reading and writing data.

In one aspect, the present invention provides a digital audio decoder having (i) an audio core which defines a hardware for matrixing and windowing during decoding of MPEG and AC-3 digital audio signals; (ii) an input RAM coupled to the audio core and configured to store discrete samples in preparation for matrixing and windowing and configured to store intermediate values that are calculated by the audio core during matrixing and written back to the input RAM.

The input RAM may be located outside of the audio core. An input RAM interface may control reading of samples from an input data partition of the input RAM and may control writing intermediate values generated during matrixing to one or more intermediate partitions of the input RAM. Furthermore, the input RAM interface may control reading intermediate values from the input RAM.

The input data partition for MPEG decoding algorithms may be provided in one location of the input RAM and the input data partition for AC-3 decoding algorithms may be provided in another location of the input RAM and the one or more intermediate partitions for MPEG decoding algorithms may be provided in one location of the input RAM and the one or more partitions for AC-3 decoding algorithms may be provided in another location of the input RAM.

The input data partition may be large enough to store at least 256 samples. At least one of the one or more intermediate partitions of the input RAM may store intermediate values for matrixing during decoding MPEG and AC-3 digital audio signals.

In one embodiment, the input RAM of the present invention includes a samples input RAM and an intermediate values input RAM, which is segregated from the samples input RAM. In this embodiment, the samples input RAM and the intermediate values input RAM may be located outside of the audio core. An input RAM interface may control reading of samples from the samples input RAM and may control writing intermediate values generated during matrixing to the intermediate values input RAM. The input RAM interface may also control reading intermediate values from the intermediate values input RAM. The samples input RAM may be large enough to store at least 256 samples. The intermediate values input RAM may include one or more partitions to store intermediate values for matrixing during decoding MPEG and AC-3 digital audio signals. The samples input RAM and intermediate values input RAM may be coupled to separate addressing logic.

In another aspect, the present invention provides a digital audio decoder having (i) means for decoding digital audio signals which defines a hardware for matrixing and windowing during decoding of MPEG and AC-3 digital audio signals; (ii) means for storing coupled to the means for decoding digital audio signals and configured to store discrete samples in preparation for matrixing and windowing and configured to store intermediate values that are calculated by the means for decoding digital audio signals during matrixing and written back to the means for storing. The means for decoding may be an audio core and the means for storing may be an input RAM.

In yet another aspect, the present invention provides a process of decoding MPEG and AC-3 digital audio signals, comprising: (i) providing a digital audio decoder including firmware and hardware that are configured to decode MPEG or AC-3 digital audio signals; (ii) receiving MPEG or AC-3 encoded digital audio signals; (iii) decoding at least partially the digital audio signals by the firmware using MPEG or AC-3 audio algorithms that precede matrixing and windowing; and (iv) performing matrixing, downmixing and windowing on MPEG or AC-3 digital audio signals by the hardware, wherein for a period of time the decoding the digital audio signals by the firmware and the performing matrixing and windowing by the hardware are carried out simultaneously.

The firmware may control the operation of a CPU and the hardware may define an audio core. The step of decoding using MPEG audio algorithms that precede matrixing and windowing may include the steps of decoding, bit allocation, decoding of scale factors and requantization. The step of decoding using AC-3 audio algorithms that precede matrixing and windowing may include the steps of providing a bit stream to an audio decoder, synchronizing the bit stream, unpacking BSI and side information, decoding exponents for current group of samples, bit allocation within the bit stream, unpacking, ungrouping, dequantizing and dithering mantissas, decoupling, rematrixing and dynamic range compression.

The above mentioned process of decoding MPEG and AC-3 digital audio signals may further include writing values produced as a result of the decoding by the firmware to a samples input RAM, after the step of decoding at least partially the digital audio signals by the firmware. The process may further still include: (i) performing downmixing and pulse code modulation by the hardware to produce an output; and (ii) writing the output produced by the hardware to an output RAM.

The step of decoding at least partially the digital audio signals by the firmware may include decoding at least partially audio data for a first channel using MPEG or AC-3 audio algorithms that precede matrixing and windowing to produce values for a first channel that are written to a samples input RAM; and the step of performing matrixing and windowing by the hardware may include performing matrixing and windowing on the values for the first channel to compute intermediate values that are written to an intermediate values input RAM.

In one embodiment of the present invention, the intermediate values input RAM is segregated from the samples input RAM. This embodiment may further include signaling the hardware to begin performing matrixing and windowing on the values for the first channel, when the firmware concludes writing the values for the first channel to the samples input RAM. Further still, this embodiment may include signaling the firmware to begin decoding at least partially audio data for a second channel using MPEG or AC-3 audio algorithms that precede matrixing and windowing, when the hardware consumes the values for the first channel in the input RAM to compute a first set of the intermediate values and completes writing the first set of the intermediate values to the intermediate values input RAM. The first set of intermediate values may be intermediate values produced after the hardware completes the pre-IFFT step of decoding AC-3 encoded data for the first channel. The first set of intermediate values may be intermediate values produced after the hardware completes the matrixing step of decoding MPEG encoded data for the first channel. This embodiment further still includes: (i) writing an output for the first channel to an output RAM after hardware completes decoding the audio data for the first channel; and (ii) waiting for the firmware to complete writing values for a second channel to the samples input RAM. The firmware may control the operation of a CPU and the hardware may define an audio core.

In yet another aspect, the present invention provides another process of decoding MPEG and AC-3 digital audio signals, comprising: (i) receiving input samples in a samples input RAM; (ii) matrixing the input samples in an audio core; (iii) writing intermediate values calculated during matrixing to an intermediate values input RAM; and (iv) windowing the intermediate values in the audio core.

The firmware and hardware partitioning of the decoding tasks in the present invention with a fully pipelined and (firmware and hardware) overlapped implementation helps in achieving multi-channel audio decoding and reconstruction within the available decode time operation with a low system clock.

These and other features of the present invention will be described in more detail below in the detailed description of the invention and in conjunction with the following figures.

DETAILED DESCRIPTION OF THE PREFERRED EMBODIMENTS

A. Application of Invention to Cores

Figure 1A:
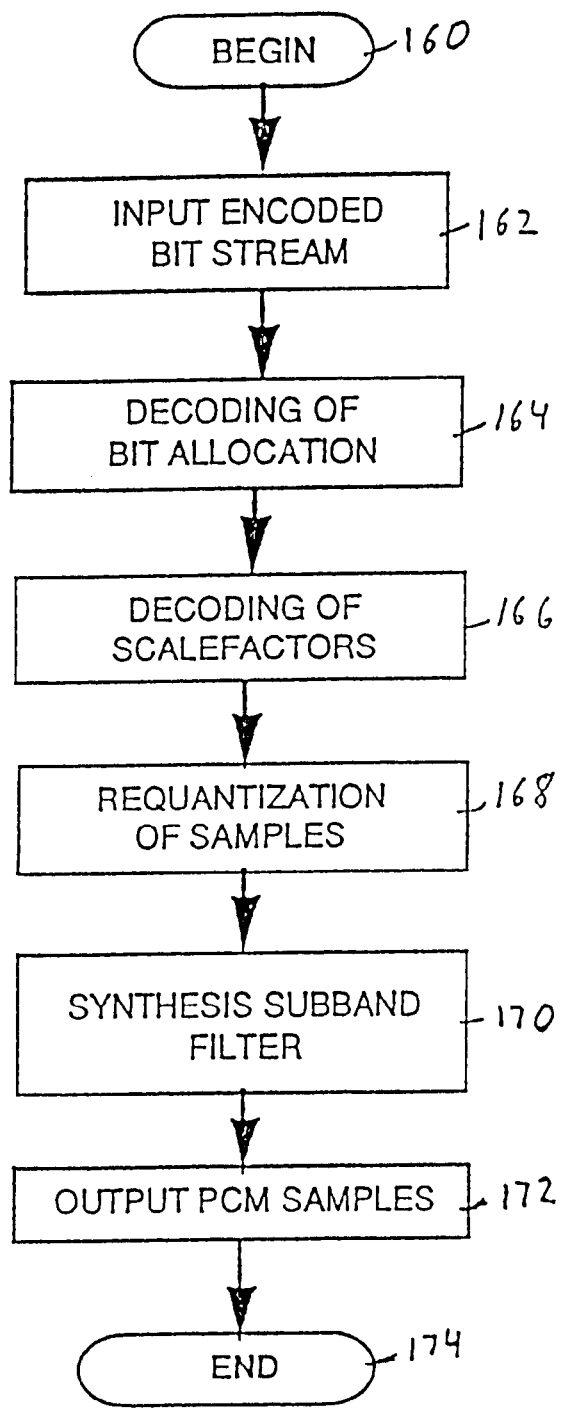
FIG. 1A is a process flow diagram illustrating the major steps required to decode MPEG audio data.

The present invention pertains to integrated circuit cores which implement at least some of the MPEG and/or AC-3 decoding requirements. As used herein, a "core" is the hardware layout of a substantially self-contained integrated circuit module such as a CPU, an Asynchronous Transfer Mode (ATM) unit, a memory unit, a network interface, a video decoder, and, the subject of this invention, an audio decoder. The physical core has associated therewith a core design which specifies a transistor-level layout including a collection of mask layouts used to generate the reticles for photolithography steps employed during integrated circuit fabrication. The core design also includes certain processing parameters associated with masks, such as ion implant energy and dose, etch conditions, oxidation conditions, chemical vapor deposition conditions, etc. Still further, the core design includes information specifying the core interface parameters such as the types of input and output signals required, the locations of the various interface connections, etc.

Some enterprises maintain libraries of cores, with each core of each library including the design information provided above. Such libraries provide competitive advantages to enterprises that make custom integrated circuits such as multi-core systems on a single semiconductor chip. Often such custom chips are not expected to sell in huge volume (at least as compared to CPU microprocessors for personal computers, for example). Thus, their design costs must be kept to a minimum. This can be accomplished by working with an enterprise that has an appropriate core design available for integration into the customer's chip design because the core need not be designed from scratch; the customer simply sets aside a "black box" of appropriate size and interface reserved for the core within its larger integrated circuit design.

As noted, core design libraries facilitate design of complex multi-functional "systems on a chip" including multiple cores integrated on single semiconductor chip. For instance, a single system on a chip might include a microprocessor core, a video decoder core, and an audio decoder core: all taken from the library of core designs. A system designer is left with the task of integrating the various cores on a single chip and providing any processing functionality not specified in the core designs.

The audio decoder core designs of the present invention possess the benefits of core designs generally as described above. Preferably, though not necessarily, the audio decoder core designs of this invention are provided as part of a larger library of core designs as described above.

While the present invention relates primarily to audio core designs and hardware, it also relates to methods of using the core designs in computer aided design of chip systems. Further, the invention relates to an apparatus for performing these operations. This apparatus may be specially constructed for the required purposes, or it may be a general purpose programmable machine selectively activated or reconfigured by a computer program stored in memory. The designs and methods presented herein are not inherently related to any particular computer or other apparatus. In particular, various general purpose machines may be used with programs written in accordance with the teachings herein, or it may be more convenient to construct a more specialized apparatus to perform the required method steps.

Still further, the present invention relates to machine readable media on which are stored (i) the audio core layout parameters and/or (ii) program instructions for using audio core in performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

B. MPEG-2 and AC-3 Decoding Process

As the present invention preferably implements portions of the MPEG-1, MPEG-2 and AC-3 audio decoding algorithms, these general decoding algorithms will now be briefly described with reference to FIGS. 1A and 1B. For purposes of the following discussion, it will be assumed that the reader has available a copy of the above identified MPEG and AC-3 Documents which were previously incorporated herein by reference.

The MPEG decoding process is detailed in FIG. 1A. As shown there, a process 158 begins at 160 and then, in a step 162, the MPEG encoded bit stream is input to the audio decoder. Thereafter, at a step 164, the system decodes bit allocation parameters which specify the sample and scale-factor size for the data in each channel. Next, at a step 166, the system decodes "scalefactors" for use in a requantization step. Requantization of the actual encoded audio samples is performed next at a step 168.

MPEG audio data is provided as collections of discrete samples which are decoded in groups of 32. Further, the encoded MPEG audio data may include samples for 1, 2, 3, 4, 5, or 6 distinct channels. If only a single channel is provided, the audio data is replayed in monaural format. If two channels of encoded data are provided, the audio information is replayed in a stereo format. The other channels provide additional audio formats, with the sixth channel providing low frequency enhancement (i.e., the sixth channel provides sub-woofer data). Note that each channel being decoded will be coded in groups of 32 samples. Thus, if the audio format is monaural, only 32 samples will be decoded per MPEG decoding cycle. However, if a stereo format is employed, the decoder will decode 64 samples per decoding cycle.

The examples and discussion presented hereinafter will be directed to the MPEG-1 standard and MPEG-2 Layer I standard in which 32 samples per channel are decoded. However, it should be understood that the invention applies equally to the MPEG-2 Layer II standard in which 32*3=96 samples per channel are decoded.

Returning again to FIG. 1A, the process steps conducted through step 168 are performed outside of the audio core of this invention. Beginning with a step 170, processing is performed within the audio core. At step 170, subband synthesis of the samples is performed. Thereafter, at a step 172, the resulting Pulse Code Modulation (PCM) samples are output from the audio core. Thereafter the process is concluded at a step 174.

The process flow 158 is reproduced from 3-A.1 (Annex) A of the MPEG document. It should be noted that MPEG audio decoding can be performed according to two formats in accordance with this invention: layer I and layer II. The above described procedure was made with respect to layer I. Layer II decoding is much like layer I decoding, except that the number of samples being processed in each audio decoding cycle is 96 rather than merely 32. Layers I and II are described generally at pages 39 through 42 of the MPEG document.

Figure 1B:
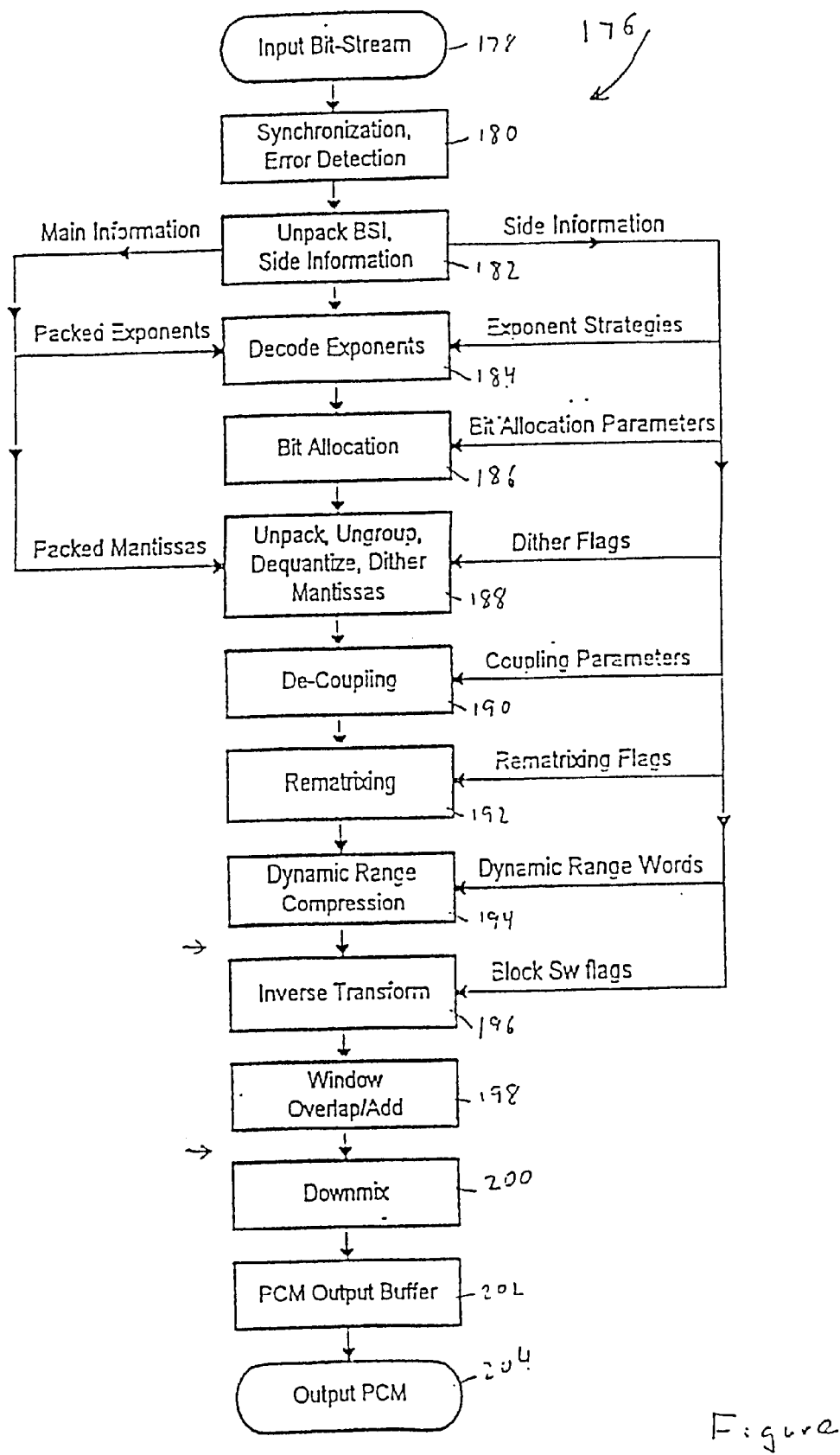
FIG. 1B is a process flow diagram illustrating the major steps required to decode AC-3 audio data.

Turning now to the process for AC-3 decoding, an AC-3 decoding process 176 is shown in FIG. 1B. This figure is reproduced from FIG. 6-1 (page 36) of the AC-3 document. The decoding process 176 begins at step 178 where the input bit stream is provided to the audio decoder. Next, at a step 180, the bit stream is synchronized and checked for errors. Thereafter, BSI and side information are unpacked at step 182. This information is employed in most of the remaining AC-3 decoding steps. Next, at step 184, the exponents for current group of samples are decoded. It should be noted that the sample data provided in the AC-3 format is in floating point format, as opposed to integer format (in the case of MPEG encoded data). Note also that the exponent strategies information (from the side information) and the actual packed exponents (from the BSI) are employed to decode the exponents at step 184.

Next, bit allocation parameters from the side information are used to allocate the bits within the bit stream at step 186. Thereafter, at a step 188, the mantissas are unpacked, ungrouped, dequantized, and dithered. Note that the actual packed manitssas are provided from BSI main information, and dither flags are provided from the side information. Following in from step 188 are a decoupling step 190, a rematrixing step 192, and a dynamic range compression step 194. Each of these steps employs the appropriate parameters or flags from the side information unpacked at step 182.

To this point, all steps in the AC-3 decoding process have been performed outside of the audio core. Beginning with a step 196, the processing is conducted within the audio core of this invention. Step 196, involves performing an inverse fast fourier transform of 256 AC-3 encoded samples. As will be explained in more detail below, this inverse fast fourier transform can be conducted in one of two modes: a 512-sample transform, and 256-sample transform. A block SW flag from the side information unpacked in step 182 specifies which of these two formats is to be employed on the incoming data. After the inverse transform step 196 has been completed, the process proceeds to a step 198 where windowing and overlap/add processing is performed. Those skilled in the art will recognize that steps 196 and 198 are equivalent to MPEG matrixing and windowing steps. These steps will be described in more detail below.

The last step inside the audio core (ACORE) is a downmixing step 200. At this point, the AC-3 processing within the audio core is complete, and further processing is again performed outside of the audio core. Thereafter, the actual PCM values are provided to an output buffer at a step 202. Finally, the PCM values are output at a step 204.

The inverse fast fourier transform, windowing, and overlap/add steps of the AC-3 process are described at pages 73 through 77 of the AC-3 standard document.

Thus, the present invention decodes and reconstructs audio data by performing a functional partitioning of the MPEG-1, MPEG-2 and AC-3 audio decoding algorithms such that some of the decoding steps are done in hardware and the remaining tasks are done in firmware as described above.

C. Audio Core Microarchitecture—High Level—Preferred Embodiment

As mentioned above, some approaches to implementing MPEG and AC-3 audio decoding have relied upon a general purpose CPU and software/firmware for performing all specified decoding steps. Unfortunately, this is not the most efficient way to handle the computationally intensive steps of the MPEG and AC-3 decoding algorithms. Further, to the extent that the CPU must be employed to perform the decoding steps, it is unavailable to perform other processing required by the system. Alternate previous approaches have relied entirely on custom hardware having a microcontroller which microsequences the control functions.

In contrast, the present invention segregates some computationally intensive MPEG and AC-3 decoding functions in dedicated hardware (the audio core), while allowing other less computationally intensive functions to be performed outside the core by a general purpose CPU for example. Thus, an IC designer is at liberty to develop specific processing capabilities for those MPEG and AC-3 decoder functions not in the audio core. Individual customers can employ the audio core of this invention and focus their design efforts on decoder functions such as run length decoding, and thereby develop a market niche on the basis of such specialization. In this invention, the audio core preferably performs the matrixing (inverse discrete cosine transform for MPEG and inverse fast fourier transform for AC-3 ), downmixing and windowing/overlap/add steps only.

Figure 2:
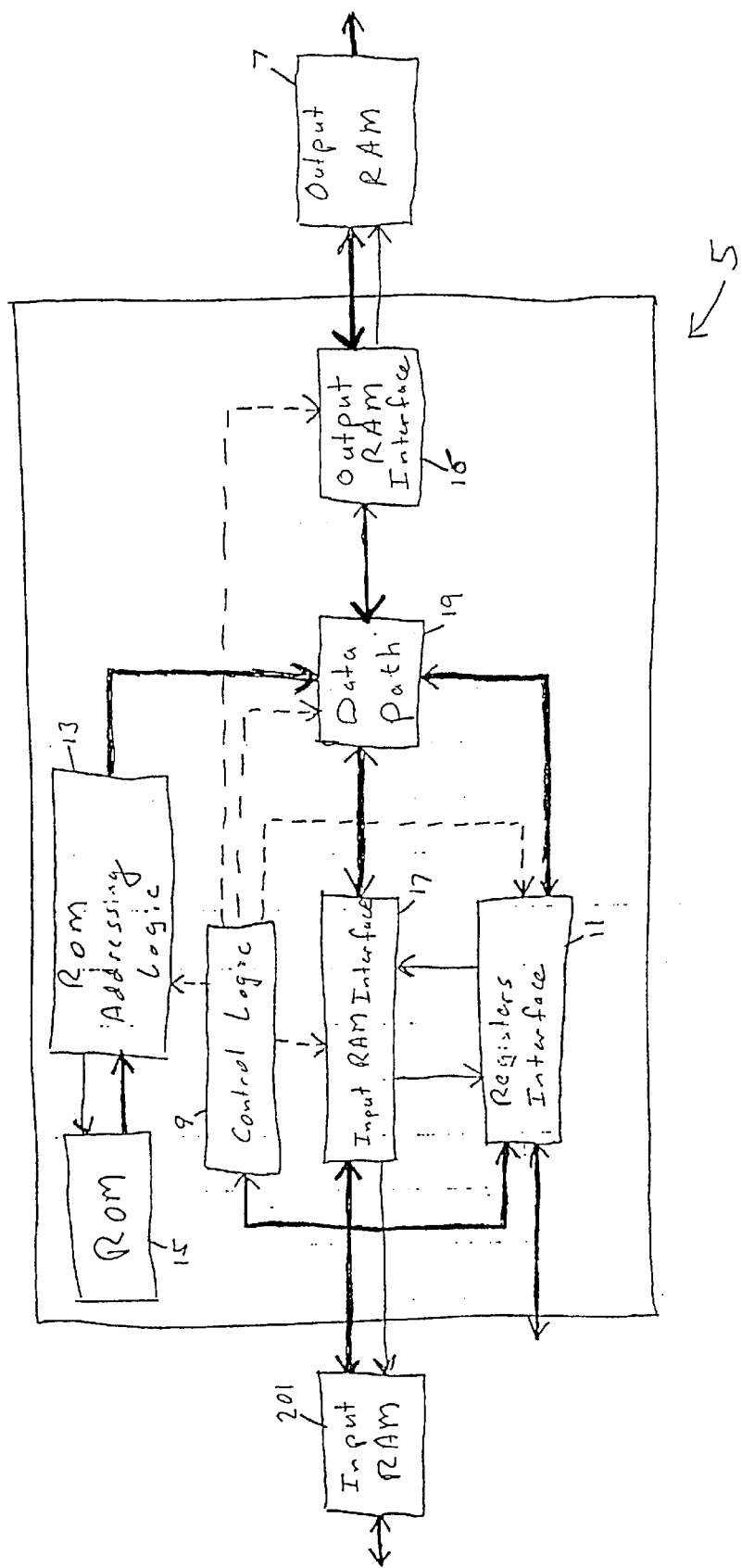
FIG. 2 is a block diagram illustrating the major hardware blocks of a audio core designed in accordance with a preferred embodiment of this invention.

FIG. 2 is a block diagram of an audio core 5 constructed in accordance with a preferred embodiment of the present invention. In this figure, dashed lines indicate control signals, thin continuous lines indicate address signals, and thick continuous lines indicate data signals. While not forming part of the audio core per se, an input RAM 201 and an output RAM 7 are components of the overall audio decoding system which directly communicate with the logical blocks of audio core 5.

The control logic for the audio core 5 resides in a control logic block 9 which includes two state machines (not shown): one of which controls MPEG processing and the other of which controls AC-3 processing. Control logic block 9 retrieves values from a register interface 11 which, in turn, receives data values from the encoded audio bit stream provided to portions of the audio decoder upstream from the audio core. Based upon the current values in the registers interface 11, the control logic block 9 provides control signals to a ROM addressing logic unit 13, an output RAM interface 16, an input RAM 17, and a data path 19. Among the signals provided by control logic block 9 are a "current state" indicative of the state of the overall MPEG or AC-3 process, and a "secondary state" indicative of the internal operation within the "current state," and a "loop count" specifying the number of loop iterations that have passed since the system entered its current state.

Sub-band samples that have already been inverse quantized and otherwise processed prior to matrixing are loaded into input RAM 201. When a sufficient number of these samples have been loaded, a signal is provided to the register interface 11 indicating that the audio core may now retrieve the samples stored in input RAM 201. At that point, the samples are provided one-by-one to input RAM interface 17. More specifically, input RAM interface 17 provides address signals to input RAM 201. The samples associated with those address values are then forwarded, in the order specified by the address signals, as data to the input RAM interface 17. From input RAM interface 17, the samples are provided, in the order received, to data path 19. There they are multiplied with appropriate values from a ROM 15 and accumulated as necessary. Note that ROM addressing logic unit 13 generates the addresses for retrieving appropriate stored data values from ROM 15.

Data path 19 performs the computational operations required for sub-band synthesis (matrixing) and windowing in accordance with the MPEG 2 and AC-3 standards. During these processes, intermediate values generated in data path 19 are temporarily written back to input RAM 201. As part of this process, input RAM interface 17 generates appropriate addresses for writing the intermediate values to input RAM 201. In subsequent processing, the intermediate values are retrieved from input RAM 201 by input RAM interface 17 and provided to data path 19 for further processing. After such further processing (that includes the steps of windowing and downmixing), the resulting values are forwarded to output RAM 7 where they are stored at addresses generated by output RAM interface 16.

In the hardware of the audio core, nearly all of the architecture is shared in MPEG and AC-3 decoding. The only major exceptions are the MPEG state machine and the AC-3 state machine.

D. Partitioning of the Input RAM in the Preferred Embodiment

Figures 2A, 2B:
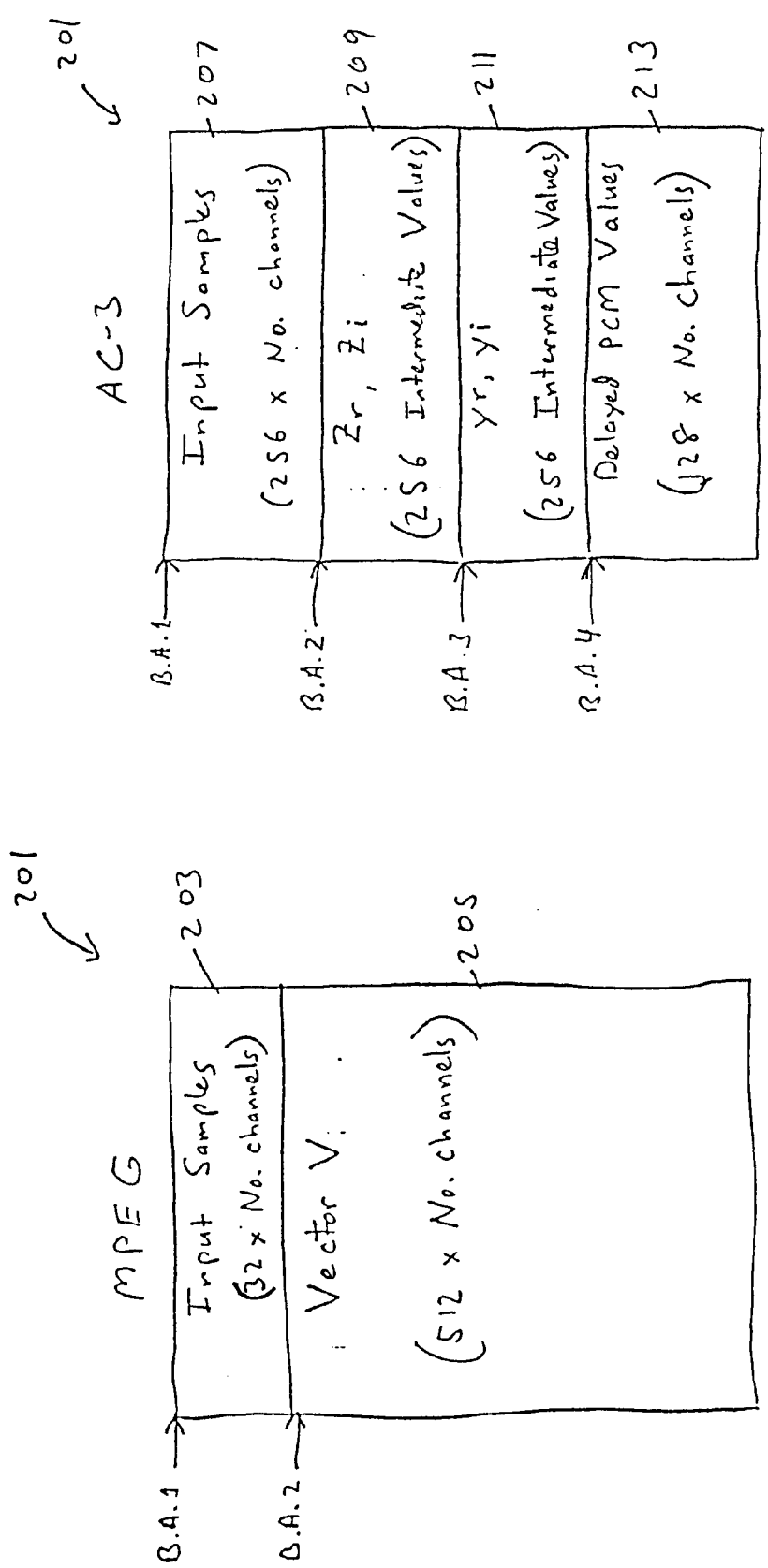
FIG. 2A is a block diagram illustrating the major audio core input RAM partitions employed for MPEG decoding and used in conjunction with the audio core shown in FIG. 2.
FIG. 2B is a block diagram illustrating the major audio core input RAM partitions employed for AC-3 decoding and used in conjunction with the audio core shown in FIG. 2.

FIGS. 2A and 2B show the partitioning of the input RAM contents. As shown, input RAM 201 will have different partitions depending upon whether the encoded data is MPEG data or AC-3 data. As shown in FIG. 2A, the MPEG partitioning provides two sections: a first section 203 in which input samples from the encoded data are stored prior to processing by the audio core and a "vector V" section 205 where intermediate values for a vector V calculated by the audio core itself are stored. The AC-3 partitioning shown in FIG. 2B includes four sections: an input sample section 207 which stores the incoming encoded data samples before they are presented to the audio core, a Zr, Zi section 209, a yr, yi, section 211, and a delayed PCM values section 213. Each of the sections 209, 211, and 213 store intermediate values calculated by the audio core during processing of input samples originally stored in section 207.

As shown in FIG. 2A, input sample section 203 is large enough to store 32 non-PCM samples times the number of audio channels, for a maximum of 32*5=160 samples. Preferably, there are 24 bits per sample. Also shown in FIG. 2A, the vector V section 205 is sufficiently large to store 512 intermediate values (from vector V) per channel, for a maximum of 2560 intermediate values of 24 bits each. When the input RAM 201 is partitioned for AC-3 processing, as shown in FIG. 2B, the input samples are stored in partition 207, which is sized to store 256 samples times the number of audio channels, for a maximum of 256*6=1536 samples. The Zr, Zi and yr, yi intermediate values are each stored in their own sections sized to contain 256 intermediate values of 24 bits each (sections 209 and 211). Finally, the delayed PCM values are stored in section 213 which is sized to store 128 values per channel.

E. Audio Core Microarchitecture—More Preferred Embodiment

Figure 3:
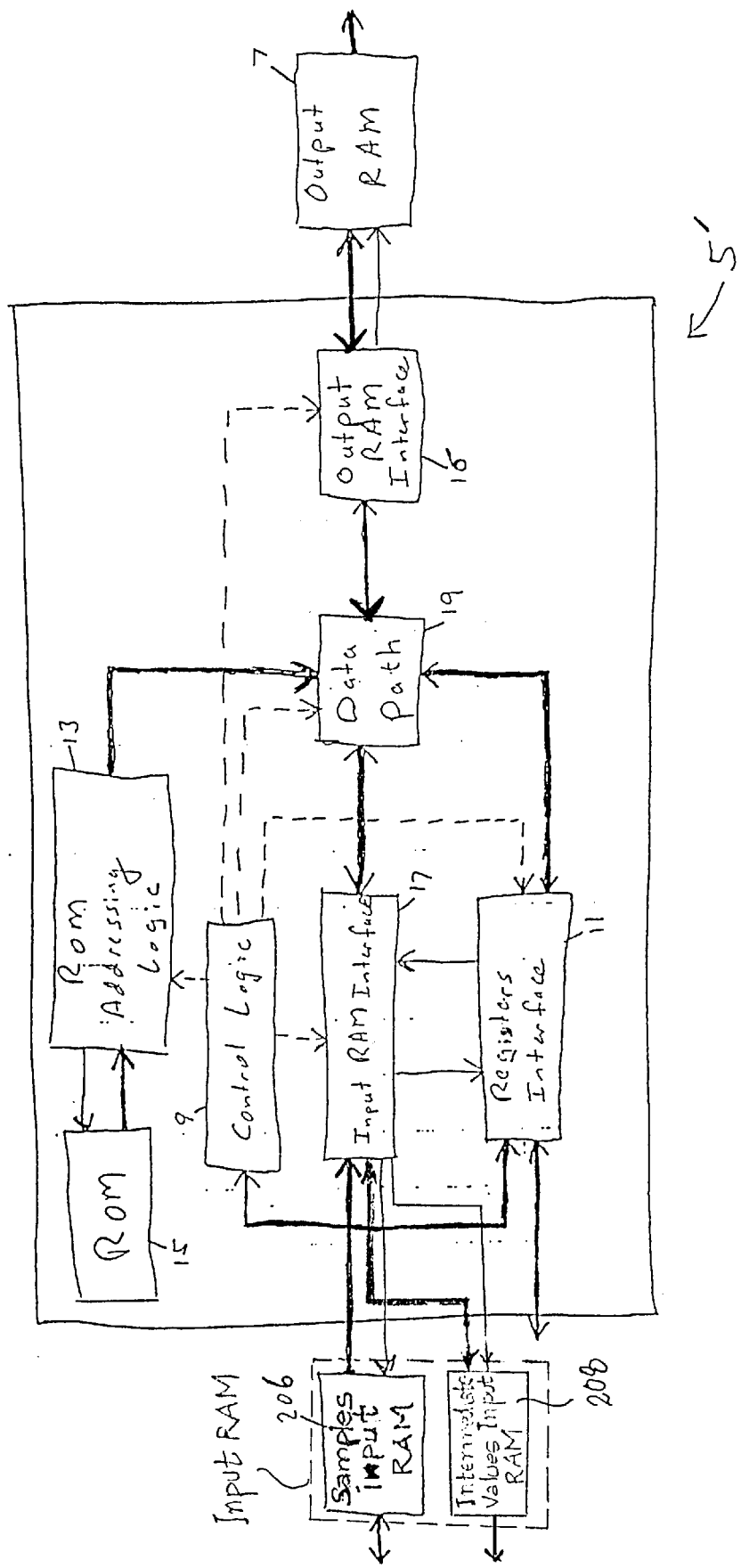
FIG. 3 is a block diagram illustrating the major hardware blocks of a audio core designed in accordance with a more preferred embodiment of this invention.

FIG. 3 is a block diagram of an audio core 5' constructed in accordance with a more preferred embodiment of the present invention. Audio core 5' is substantially similar to audio core 5 of FIG. 2, except input RAM 201 of FIG. 2 is segregated into two discrete components in FIG. 3, which components include a samples input RAM 206 and an intermediate values input RAM 208. While not forming part of the audio core per se, samples input RAM 206 and an intermediate values input RAM 208 are components of the overall audio decoding system which directly communicate with the logical blocks of audio core 5'.

After control logic block 9 retrieves values from a register interface 11 which, in turn, receives data values from the encoded audio bit stream provided to portions of the audio decoder upstream from the audio core, control logic block 9 provides a "current state" signal indicative of the state of the overall MPEG 2 or AC-3 process, a "secondary state" (or "secstate") signal indicative of the internal operation within the "current state" (or "curstate") and a "loop count" (or "loopcnt") specifying the number of iterations that have passed since the system entered its current state. Sub-band samples that have already been inverse quantized and otherwise processed prior to matrixing are loaded into samples input RAM 206. When a sufficient number of these samples have been loaded, a signal is provided to the register interface 11 indicating that the audio core may now retrieve the samples stored in samples input RAM 206. At that point, the samples are provided one-by-one to input RAM interface 17. More specifically, input RAM interface 17 provides address signals to samples input RAM 206. The samples associated with those address values are then forwarded, in the order specified by the address signals, as data to the input RAM interface 17. From input RAM interface 17, the samples are provided, in the order received, to data path 19. There they are multiplied with appropriate values from a ROM 15 and accumulated as necessary. Note that ROM addressing logic unit 13 generates the addresses for retrieving appropriate stored data values from ROM 15.

Data path 19 performs the computational operations required for sub-band synthesis (matrixing) and windowing in accordance with the MPEG 2 and AC-3 standards. During these processes, intermediate values generated in data path 19 are temporarily written back to intermediate values input RAM 208. As part of this process, input RAM interface 17 generates appropriate addresses for writing the intermediate values to intermediate values input RAM 208. In subsequent processing, the intermediate values are retrieved from intermediate values input RAM 208 by input RAM interface 17 and provided to data path 19 for further processing. After such further processing, the resulting values are forwarded to output RAM 7 where they are stored at addresses generated by output RAM interface 16.

When the output for a specific channel is complete, control logic block 9 may provide another signal to the register interface 11 indicating that the firmware (CPU) may now retrieve the samples for a subsequent channel.

F. Partitioning of the Input RAM in the More Preferred Embodiment

Figures 3A, 3B:
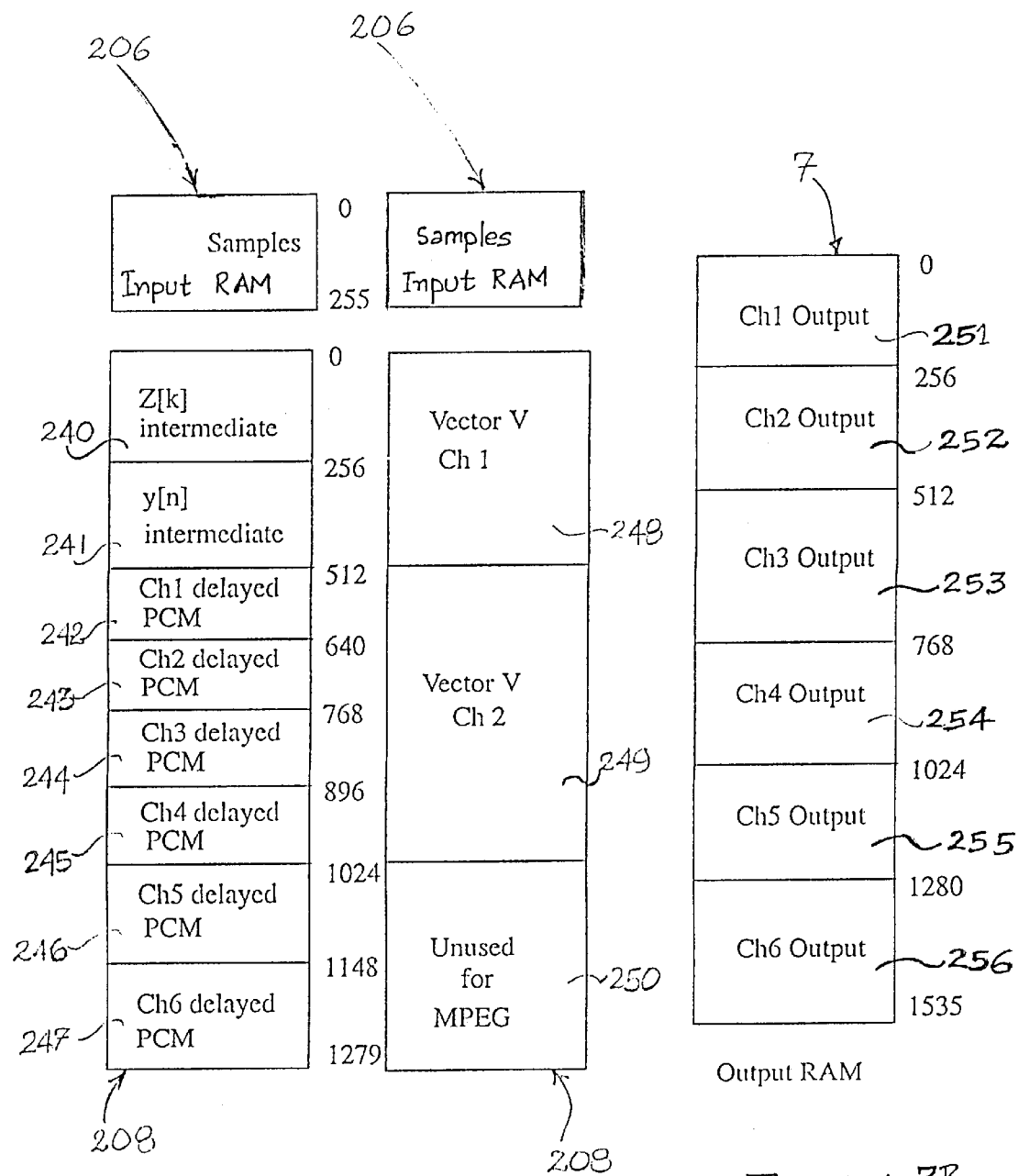
FIG. 3A is a block diagram illustrating a samples input RAM separated from an intermediate values input RAM, which RAM structures are employed for MPEG and AC-3 decoding and used in conjunction with the audio core shown in FIG. 3.
FIG. 3B is a block diagram illustrating the major output RAM partitions employed for MPEG and AC-3 decoding.

FIG. 3A shows the partitioned samples input RAM 206 and intermediate values input RAM 208, according to a more preferred embodiment of the present invention. The incoming encoded data samples before they are presented to the audio core are stored in samples input RAM 206. Samples input RAM 206 may not be partitioned for MPEG or AC-3 decoding and is generally large enough to store a maximum of 256 samples. Portions of samples input RAM 206, however, may be unused for MPEG decoding. By way of example, for decoding MPEG audio data, 32 samples of the current audio channel are stored in a RAM structure that may be capable of holding 256 sample values. Of course, for AC-3, the entire samples input RAM 206 is used for storing 256 sample values.

As shown in FIG. 3A, intermediate values input RAM 208 will, however, have different partitions depending upon whether the encoded data is MPEG data or AC-3 data. When decoding MPEG encoded data, intermediate values input RAM may provide five "vector V" sections, where intermediate values for a vector V for each of the five non-PCM channels calculated by the audio core itself are stored, and for this case the intermediate values input RAM is capable of storing 512*5=2560 values. Frequently, however, MPEG decoding involves processing audio data for two channels and in this case intermediate values input RAM 208 (shown as the RAM structure on the right in FIG. 3A) may provide two "vector V" sections 248 and 249 capable of storing 512*2=1024 values. Furthermore, a section 250 in intermediate values input RAM 208 may remain unused.

The AC-3 partitioning (shown as the RAM structure on the left in FIG. 3A) includes eight sections: a Z[k] section 240, a y[n] section 241, and six delayed PCM values sections 242, 243, 244, 245, 246 and 247, one for each channel and each section is sized to store 128 values. Z[k] section 240 and y[n] section 241 store intermediate values calculated by the audio core during processing of input samples originally stored in samples input RAM 206. Sections 240 and 241, which are sized to store 256 values, act like "scratch pads" because intermediate values are stored at these locations temporarily. By way of example, the audio core may read from and compute a new set of intermediate values based on the intermediate values stored in section 241 and write the new set of intermediate values to section 240. Thus, the intermediate values (results of the pre-IFFT step, for example) that were stored in section 240 before the computation by the audio core described above are replaced by the new set of intermediate values.

The segregation of the input RAM into two distinct blocks, according to the more preferred embodiment, facilitates in achieving the maximum possible firmware and hardware overlap during implementation. As will be explained later, firmware and hardware partitioning of the audio decoding tasks and an overlapped firmware and hardware implementation enables the present invention to perform multi-channel audio decoding in the available decode time per audio frame, with a low system clock.

G. Partitioning of the Output RAM

FIG. 3B shows output RAM 7 in accordance with one embodiment of the present invention. After the audio core concludes downmixing, the output of each channel is stored in the Output RAM at the appropriate section. As shown in FIG. 3B, output RAM may include six sections 251, 252, 253, 254, 255 and 256, each sized to store 256 values.

H. MPEG Matrixing and Windowing

Figure 4:
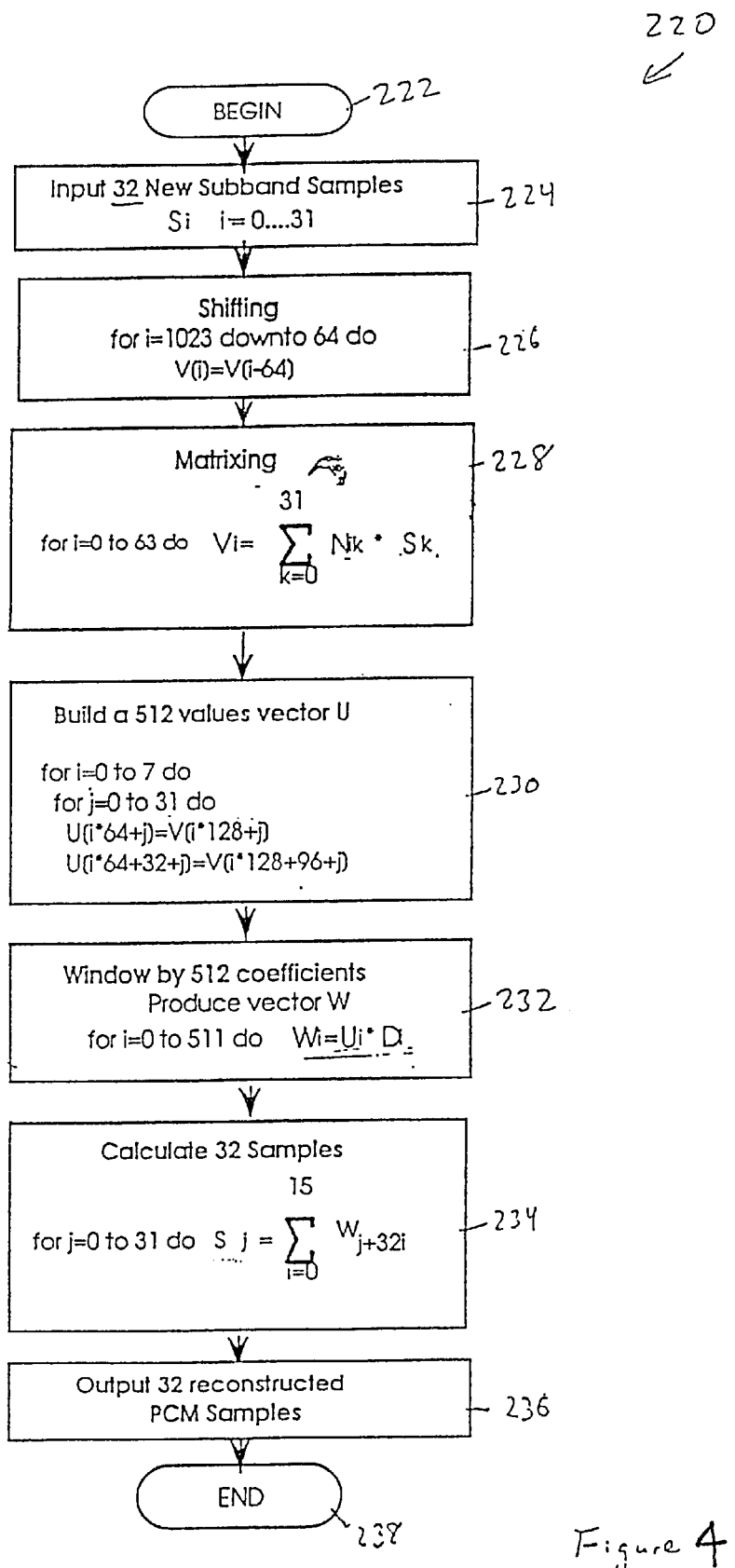
FIG. 4 is a process flow diagram of the principal MPEG Layer I and Layer II matrixing and windowing steps reproduced from the MPEG Document.

FIG. 4 is a flow chart reproduced from the MPEG Document. The process depicts the matrixing and windowing steps as required by the MPEG standard (corresponding to the step 170 of FIG. 1A). The process begins at 222 and proceeds to a step 224 where 32 new samples (per channel) are input. Thereafter, at step 226, the system implementing MPEG "shifts" the indices of elements constituting a vector V. Vector V is made up of 1024 previously stored values. As suggested by the MPEG standard, the shifting process involves freeing up 64 slots (V0–V64) by subtracting 64 from the indices of each of the 1024 existing values in vector V. In this manner, the vector values 960 through 1023 are shifted out of vector V.

Next, at a step 228, this system performs a matrixing operation (one dimensional inverse discrete cosine transform or IDCT) in which 64 new values are provided for vector V. These values are given indices $V_0$ through $V_{63}$ and are calculated according to the following expression:

$$V_i = \Sigma N_{ik} * S_k \text{ (for } k=0 \text{ to } 31 \text{ and } i=0 \text{ to } 63)$$

In this expression, the values of $S_k$ are the 32 samples which were input at step 224, and the values of $N_{ik}$ are constants given by the equation $N_{ik}=\cos[(16+i)(2k+1)\pi/64]$.

Next, at a step 230, a vector U is created by reindexing the values of vector V according to the expressions shown in 230 of FIG. 4.

for i=0 to 7 do
  for j=0 to 31
    U(64i+j)=V(128i+j)
    U(64i+32j)=V(128i+96j)

Note that vector U will have only half the number of values as vector V (i.e., 512 values versus 1024 values).

The above described set of steps (steps 224, 226, 228, and 230) describe the matrixing operation performed by the audio core. After matrixing has completed at step 230, the windowing process begins at a step 232. As indicated at step 232 in FIG. 4, multiplying each value of vector U by a distinct coefficient Di, produces one value of vector W. The values for $D_i$ are provided in Table 3-B.3 (page B-6 though B-8) of Annex B of the MPEG Document. After the vector W has been created, 32 output PCM samples (j=0 to 31) are calculated at a step 234 according to the expression shown in FIG. 4.

$$S_j = \Sigma W_{j+32i} \text{ (for } i=0 \text{ to } 15)$$

In this expression, the individual sample values are noted by "Sj". As shown, each sample is constructed by summing 16 different values from vector W. Thus, each of the 32 samples employs 16 unique values from vector W, so that each value comprising vector W is used only one time in the construction of the 32 samples. After the samples have been constructed in step 234, a step 236 outputs the reconstructed PCM samples which are ready for playback. The process is completed at 238.

The present invention combines certain of the above mathematical operations required by the MPEG standard and then generates storage addresses for the resulting values according to an indexing scheme that condenses the above-described process to the following steps: (1) an input sub-band sample step, (2) a matrixing step, (3) a windowing step, and (4) an output reconstructed PCM samples step. Thus, in the flow chart of FIG. 4, steps 226, 228, and 230 are combined into a single matrixing step. Similarly, steps 232 and 234 are combined into a single windowing step. In this manner, the sub-band synthesis and windowing step can be performed faster and with fewer resources than is suggested by the MPEG document.

I. Preferred Implementation of the Functionally Partitioned Firmware/Hardware Operating in Sequence In a preferred embodiment, audio core design shown in FIG. 2 is employed for decoding audio data. According to this embodiment, the CPU performs the steps of decoding, bit allocation, decoding of scale factors and requantization and loads the 32 new sub-band samples into the input RAM 201. The audio core begins processing after it is informed that 32 new sub-band samples for the current channel to be processed, have been loaded into the input RAM 201. At that point, the audio core begins sub-band synthesis of the 32 values stored for the first channel. In this embodiment, the firmware and hardware operate on a set of encoded samples sequentially, i.e. the hardware (audio core) contributes to the decoding process after the firmware has concluded its contribution in the decoding of the 32 samples. Furthermore, in this embodiment, when the hardware takes over the decoding process (as described hereinafter), the firmware is idle and does not contribute to the decoding process until the hardware writes the output to output RAM 7.

Sub-band synthesis entails producing 32 new values for vector V according to the expression shown in step 228 of FIG. 4. The audio core then writes the 32 new values to addresses in the vector V partition of input RAM 201 at locations where old vector V values $V_{480}$ through $V_{512}$ are overwritten. In this manner, shifting step 226 (FIG. 4) is effectively performed. Further, the addresses employed by the audio core for storage of the vector V values are accessed as necessary according to the indices specified for the vector U as indicated in step 230 of FIG. 4. Thus, the audio core performs steps 226, 228, and 230 by simply calculating the 32 new values for vector V and applying an appropriate address to write and read each of these values.

As noted, the audio core performs steps 232 and 234 of FIG. 4 in a single step. This is accomplished by performing the summation shown in step 234 while in the same step generating the values of vector W only as needed for the summation. For example, for j=0 and i=0, the value of vector W is obtained by multiplying the value $U_0$ by the windowing coefficient $D_0$. In this manner, the step of initially calculating all 512 values of vector W is postponed to streamline the data retrieval process.

A few points regarding the process of FIG. 4 are worth noting. First, for each 32 samples (per channel) loaded into input RAM 201, 32 values of vector V are generated. However, a total of 512 values are stored in the entire vector V. With each step of generating 32 new values of vector V the oldest 32 values in the entire vector V are shifted out. Thus, at any given time, the 16 most recent collections of 32 input samples (per channel) provide values currently stored in vector V. Second, while there are a total of 1024 values in vector V, according to the MPEG documents, some symmetry in the values of coefficient $N_{ik}$ require storage of only 512 values as vector V in the audio core implementation. That is, half of the values in original vector V are not stored in vector V of the audio core implementation. This is because each unique value in vector V has a corresponding value also within vector V that is opposite in sign. Thus, the information content in the 1024 values of vector V, as per the MPEG standard, is maintained in the 512 values of vector V of the audio core implementation.

J. More Preferred Implementation of the Functionally Partitioned Firmware/Hardware in an Overlapped Manner In a more preferred embodiment, audio core design shown in FIG. 3 is employed for decoding audio data. According to this embodiment, the CPU performs the steps of decoding, bit allocation, decoding of scale factors and requantization and loads the 32 new sub-band samples into the samples input RAM 206. The audio core begins subband synthesis after it is informed that 32 new sub-band samples per channel (for a maximum of 192 sub-band samples of 24 bits each) have been loaded into samples input RAM 206 and produces 32 new values for vector V according to the expression shown in step 228 of FIG. 4. The audio core then writes the 32 new values to vector V section 248 of channel 1 in intermediate values input RAM 208. The present invention recognizes that at this point, the values stored in samples input RAM 206 can be overwritten by new sample values for channel 2. It is important to bear in mind that until the sub-band synthesis process for channel 1 is completed by the hardware mentioned above, the firmware does not overwrite the samples of channel 1 in samples input RAM 206. After the hardware concludes writing to vector V section 248 of channel 1 in intermediate values input RAM 208, however, the firmware in this embodiment proceeds to decode the next 32 samples of audio data for channel 2.

In this embodiment, the functions of the firmware and hardware during the decoding process overlap, i.e. the hardware (audio core) and the firmware contribute to decoding simultaneously. Furthermore, the firmware is not idle and begins decoding audio data for a subsequent channel as the hardware concludes MPEG matrixing step on the audio data for the previous channel. Consequently, the more preferred embodiment of the present invention is able to perform MPEG-1 two channel/MPEG-2 multi-channel audio decoding, within the available decode time per frame of 24 milliseconds and with a low system clock of about 54 MHz.

Figure 5:
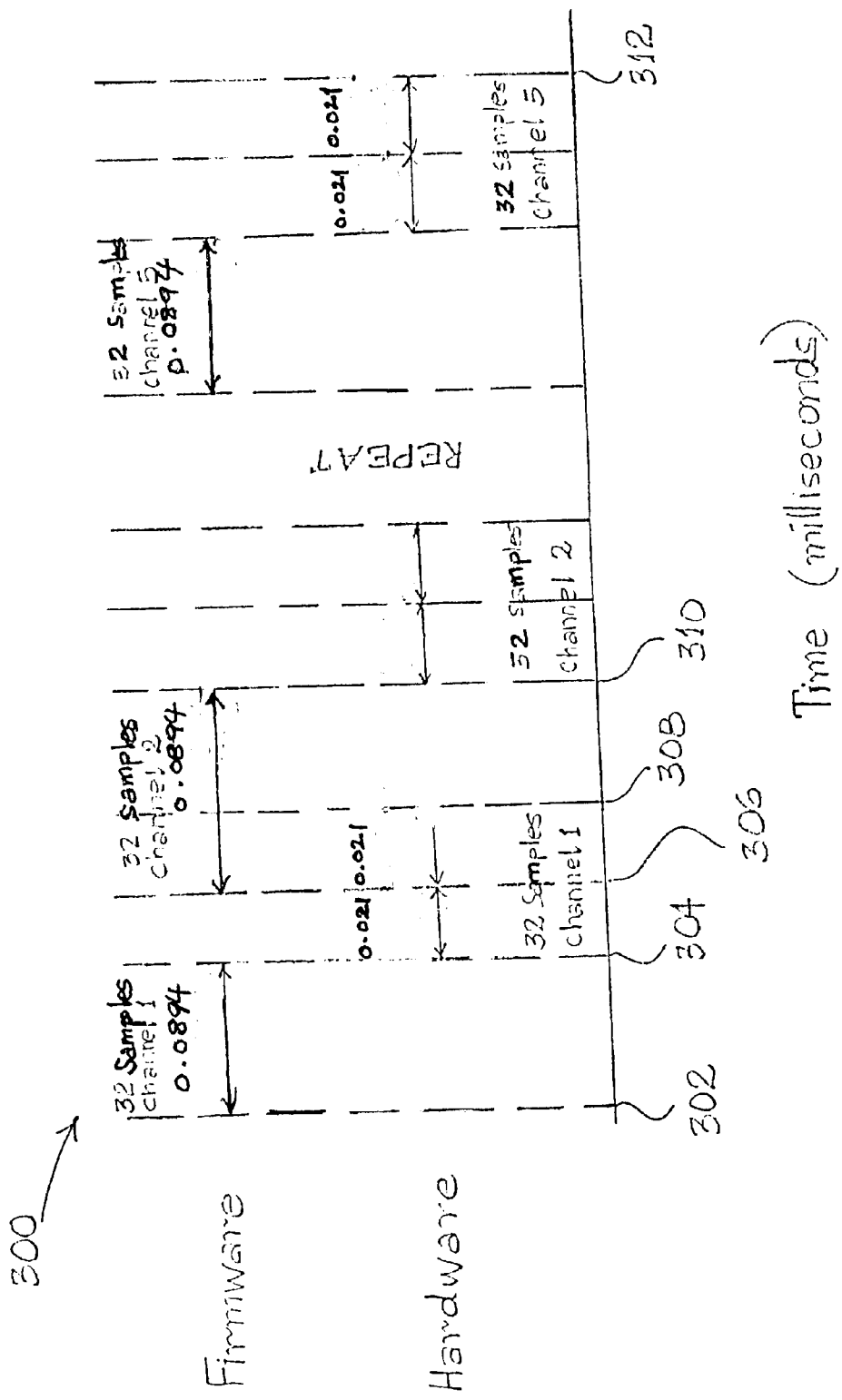
FIG. 5 is a timeline showing when and for how long the firmware and hardware are active during an MPEG audio data decoding process, according to a more preferred embodiment of the present invention.

FIG. 5 shows a time line of when the partitioned firmware and hardware are active during the MPEG decoding process, according to a more preferred embodiment of the present invention. At time (t) equals zero, denoted by reference numeral 302, both the firmware and hardware are idle. The decoding process then begins when the firmware (CPU) starts performing step 162 of FIG. 1A, which step for a five channel audio frame may take about 3.1291 milliseconds. Similarly, steps 164, 166 and 168 of FIG. 1A are also performed by the firmware. For a five channel audio frame, step 164 may take about 0.2279 milliseconds, step 166 may take about 0.4857 milliseconds and step 168 may take about 12.2510 milliseconds. Thus for a five channel audio frame, the total time consumed by the firmware to perform steps 162, 164, 166 and 168 is about 16.09365 milliseconds, which translates into about 0.0894 milliseconds per 32 samples at a low system clock of about 54 MHz. Referring back to FIG. 5, when time (t) equals about 0.0894 milliseconds, denoted by reference numeral 304, the firmware writes 32 samples of channel 1 to samples input RAM 206 (shown in FIGS. 3 and 3A) and goes into idle mode. At this point, the firmware signals the hardware to begin its decoding of the audio data as described below. In one embodiment, a control logic unit signals the hardware to begin decoding.

The hardware (ACORE) begins step 170 of FIG. 1A (sub-band synthesis) to produce 32 new values for vector V. After 0.021 milliseconds have elapsed, denoted by reference numeral 306 in FIG. 5, ACORE completes step 170 and writes the 32 new values of channel 1 to vector V section 248 in intermediate values input RAM 208 of FIG. 3A. At this point, both the hardware and the firmware contribute to the decoding process. The hardware proceeds to step 172 of FIG. 1A and the firmware retrieves the next 32 samples of channel 2 to commence decoding, as described for 32 samples of channel 1. After another 0.021 milliseconds have elapsed (denoted by reference numeral 308 in FIG. 5), the hardware finishes decoding the MPEG encoded audio data, writes the output to output RAM 7 and waits for the firmware to finish processing the 32 samples for channel 2. As mentioned above, the firmware takes about 0.0894 milliseconds to complete steps 162, 164, 166 and 168 and at reference numeral 310 in FIG. 5, these steps performed by the firmware are completed. In this manner, decoding of a single audio frame concludes when 32 samples for the fifth channel are completed at reference numeral 312 in FIG. 5.

Thus, according to one embodiment of the present invention, the time consumed to decode an audio frame of five channels and thirty-six blocks takes about ((0.042+ 0.0684)(36)(5)+(0.0894))=19.9614 milliseconds, which is less than the available time of 24 milliseconds for decoding MPEG audio data. Thus, the firmware and hardware partitioning of the decoding tasks in the present invention with a fully pipelined and (firmware and hardware) overlapped implementation helps in achieving multi-channel audio decoding and reconstruction within the available decode time operation with a low system clock of about 54 MHz to a high system clock, e.g. about 108 MHz. Those skilled in the art will recognize that a low system clock translates into lower power consumption.

K. RAM and ROM Address Generation in the Audio Core

Preferably, new addresses are generated by input RAM interface 17 from two parameters: a base address and an offset. A first level base address is provided for the beginning of each partition of input RAM 201. As shown in FIG. 2A, a base address B.A.1 is provided to indicate the beginning of input samples partition 203 and a base address B.A.2 is provided to indicate the beginning of vector V partition 205. As shown in FIG. 2B, a base address B.A.1 is provided at the beginning of input samples partition 207, a base address B.A.2 is provided at the beginning of $Z_r$, $Z_i$ partition 209, a base address B.A.3 is provided at the beginning of $y_r$, $y_i$ partition 211, and a base address B.A.4 is provided at the beginning of delayed PCM values partition 213. For the MPEG and AC-3 input samples partition of input RAM 201, as well as for the MPEG vector V partition and the AC-3 delay values partition, a unique second level base address is provided for each channel of stored input sub-band samples.

To retrieve an input sample in the case of MPEG decoding, the offset need be not greater than the value of 32 (the maximum number of stored sub-band samples). The results of matrixing are written into the intermediate values input RAM partition of 512 values for that channel. Hence, for MPEG matrixing read and write address calculation, a 9 bit offset is used. This reduces the processing resources required for address generation. Specifically, at any given clock cycle, the input RAM interface 17 generates an input RAM address by performing a concatenation of the 3 bit base address with a 9 bit offset address.

The proper base address and offset for each stage of the sub-band synthesis and windowing steps performed by the audio core may be uniquely specified as follows. The MPEG and AC-3 processes may be divided into a series of "states". For example, the MPEG process is divided into a matrixing state, a windowing state, and an output state. Within each state, a defined number of cycles is required to complete the operations required by that state. Further, the "loop count" and "secondary state" within each current state unambiguously specify what operation is being performed. Therefore, the audio core state, "secondary state" and "loop count" within that state uniquely specify addresses associated with input RAM 201, output RAM 7, and ROM 15. Those addresses are provided as a combination of a base address and an offset as mentioned above.

It should be understood that it requires a few cycles to generate each address. Specifically, various offset values must be multiplexed to generate a single offset value used to calculate the current address. Similarly, multiple base addresses must be multiplexed to generate a single base address used to generate the current address. Further, the offset must be added to the base address. Thus, the current addresses provided by the input RAM interface 17, the output RAM interface 16, and the ROM interface 13 are not generated instantaneously. As a result, the audio core must be designed to begin the address generating process one clock cycle before the address is actually used by the various interfaces. In a pipelined implementation of the "current state" in the audio core, each clock cycle may represent more than one operation. For example, in a certain clock cycle, audio core might by multiplying data 1 and data 2, while generating the addresses for data 3 and data 4 simultaneously. Hence, more than one operation takes place in any clock cycle in a pipelined implementation.

Those skilled in the art will recognize that the above described RAM and ROM addressing logic can similarly extend to the more preferred embodiment of FIG. 3. By way of example, a first level base address, e.g., B.A.1, may be provided at the beginning of samples input RAM 206 of FIG. 3A and another first level base address, e.g., B.A.2, may be provided at the beginning of intermediate values input RAM 248. Similarly, for AC-3 decoding, a base address B.A.1 may be provided at the beginning of samples input RAM 206, a base address B.A.2 may be provided at the beginning of Z[k] partition 240, a base address B.A.3 may be provided at the beginning of y[n] partition 241, and a base address B.A.4 may be provided at the beginning of delayed PCM values partition 242.

L. Audio Core Microarchitecture—The Input RAM Interface

Figure 6A:
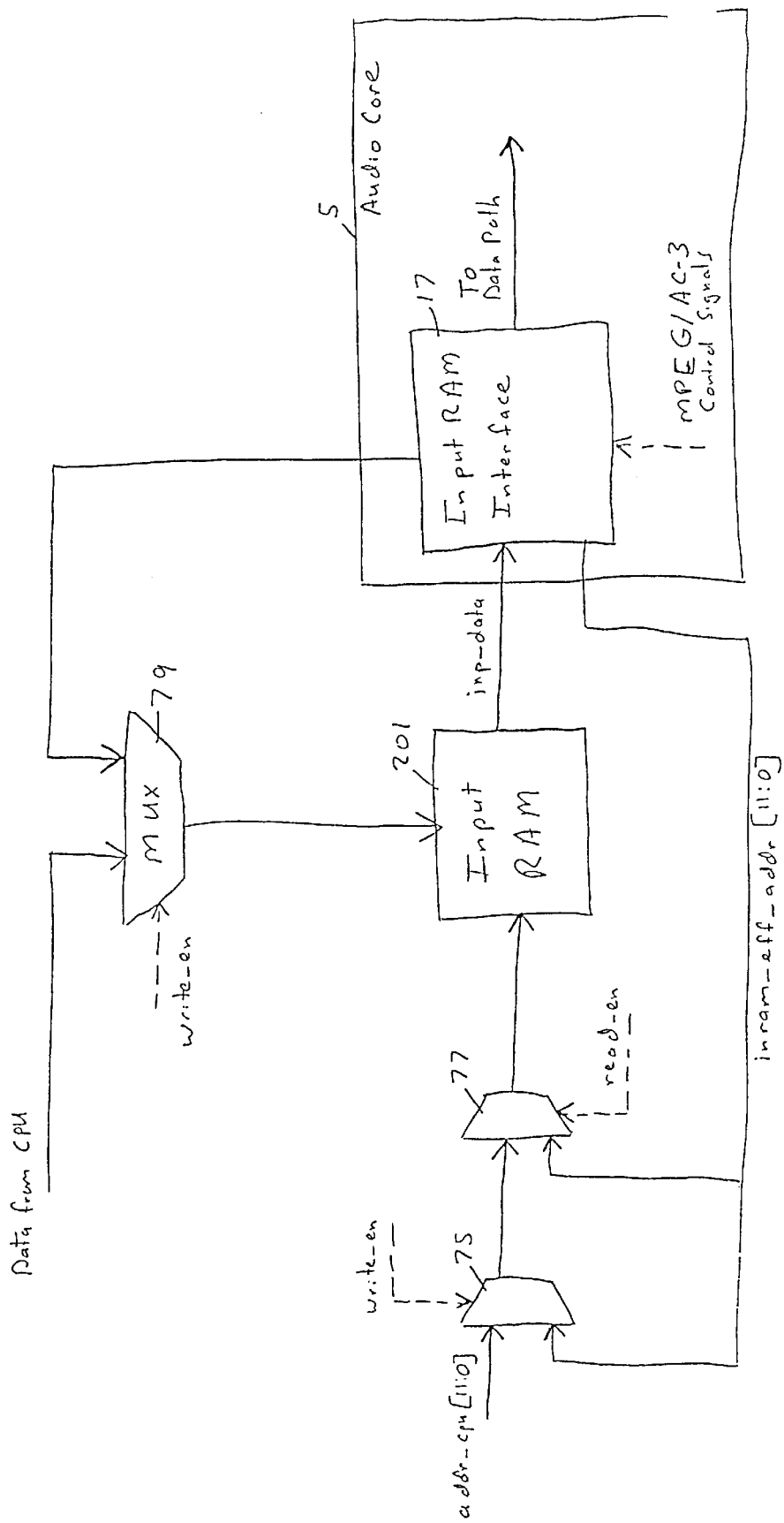
FIG. 6A is a block diagram of the input RAM 201 and relevant address and data hardware within and without the audio core.

FIG. 6A shows how input RAM interface 17 of the audio core 5 communicates with the input RAM 201 and associated control features lying outside of the audio core. These external features may be implemented as hardware or firmware under the control of a system CPU.

When an appropriate MPEG-2 or AC-3 control signal is received by input RAM interface 17 from control logic block 9, input RAM interface 17 will initially perform two functions. It will generate an address to a location within input RAM 201 and it will provide appropriate signals to the firmware outside of the audio core to specify how data and addresses to input RAM 201 are to be arbitrated.

Assuming that data from outside the audio core (e.g., sub-band samples in the incoming bit stream) are to be written to input RAM 201 (partition 203), the audio core will control the process as follows. First, in response to appropriate information from control logic block 9, audio core will provide a deasserted write enable signal to a multiplexer 75. This directs multiplexer 75 to pass only the addresses generated by a system CPU. Those addresses will then also be passed by a multiplexer 77 so long as the read enable signal from audio core 5 is also deasserted. The CPU generated address is then provided to input RAM 201 and data is written from a source outside the audio core. Specifically, data from an encoded bitstream passed through a multiplexer 79 to input RAM 201 at the address specified (in partition 203).

Now suppose that all 32 sub-band samples for each channel being decoded have been written from the input bit stream to the input samples partition 203 of input RAM 201. At that point, the samples may be serially read in to the audio core 5 by input RAM 17. To accomplish this, input RAM interface 17 generates an appropriate address in response to the current MPEG-2 or AC-3 control signals, and, in addition, provides an active read enable signal to multiplexer 77. The effective input RAM address signal generated by input RAM interface 17 is provided to multiplexers 75 and 77. Under these conditions, multiplexer 77 will receive two different addresses one specified by the input RAM interface and the other specified by the logic outside of the audio core. Because the read enable signal is active and the write enable signal is not active, multiplexer 77 will pass the address specified by input RAM interface 17. Thus, that address will be provided to input RAM 201 so that data can be read from the desired location of the input RAM.

Assume now that the audio core has performed some intermediate processing to generate intermediate values and these values must be written back to appropriate locations in input RAM 201. In the case of MPEG processing, these values have to be written to partition 205. In the case of AC-3 processing, these values will be written back to partitions 209, 211, and/or 213. Again, input RAM 17 generates an address based upon the current values of certain control signals provided to it. In addition, the audio core provides an active write enable signal and a not active read enable signal to the multiplexers 75 and 79. Thus, the effective address generated from input RAM 17 is passed through multiplexer 75 and thereafter reaches input RAM 201. Further, the data from input RAM interface 17 passes through multiplexer 79 to be written to the input RAM 201 at the location specified by the current effective address form input RAM interface 17.

Figure 6B:
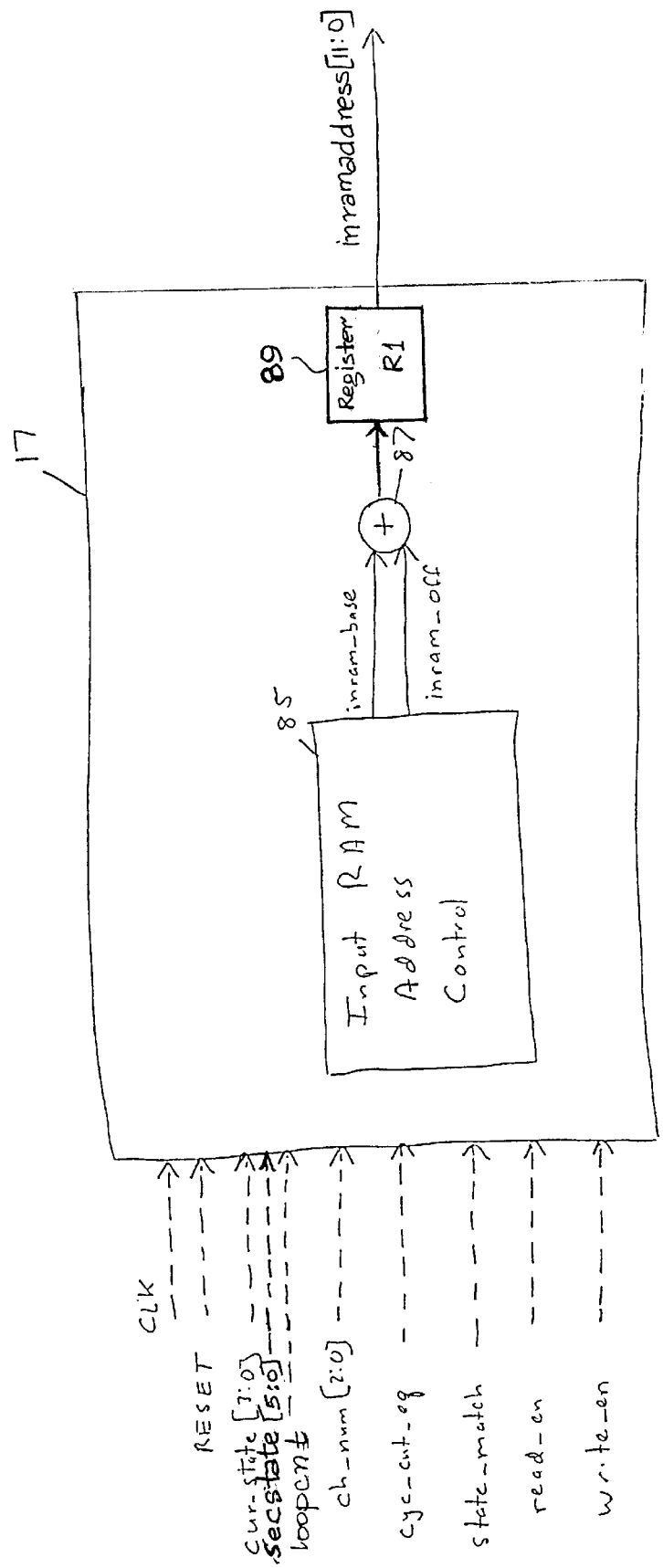
FIG. 6B is a block diagram of an audio core input RAM interface in accordance with a preferred embodiment of the present invention.

FIG. 6B details the architecture of input RAM interface 17. As shown, the signals provided to input RAM interface 17 include clock and reset signals, as well as the current state, secondary state, loop count, channel number, cycle count equal, state match, read enable, and write enable signals. These signals are used by an input RAM address control logic block 85 to generate two values: an input RAM base address and an input RAM offset. The 3 bit channel number input is provided to specify the base address within input RAM 201. Remember that a separate base address is provided for each channel of data stored in the input RAM.

Regarding the calculation of the base address. As noted, CSR subregisters 2 and 3 provide the initial base address for data being written into input RAM 201 or intermediate values input RAM 208. Below these high level base addresses identifying the various partitions of input RAM 201 or intermediate values input RAM 208, there are lower level base addresses separated from one another by constant distances. Each of these lower level base addresses correspond to the first address for a given channel. Thus, input RAM address control 85 can calculate the low level base address from the channel number input signal. An adder 87 adds the value of this low level base to the offset to generate an effective address which is provided to the input RAM 201 or intermediate values input RAM 208.

The effective address is stored in a register 89, which may be read by other components of the audio decoder. Note that the value written into register 89 does not specify whether the corresponding location is to have data written to it or read from it. That depends upon the values 0 or 1 assigned to the read enable bit and the write enable bit.

Preferably, samples input RAM 206 is designed to have one read/write port, which is accessible to the audio core for read operation, and accessible to the firmware for write operation. Preferably, the intermediate values input RAM 208 is also a one read/write port RAM, which is accessible for read/write by the audio core and accessible to the firmware for read operation.

Figure 7:
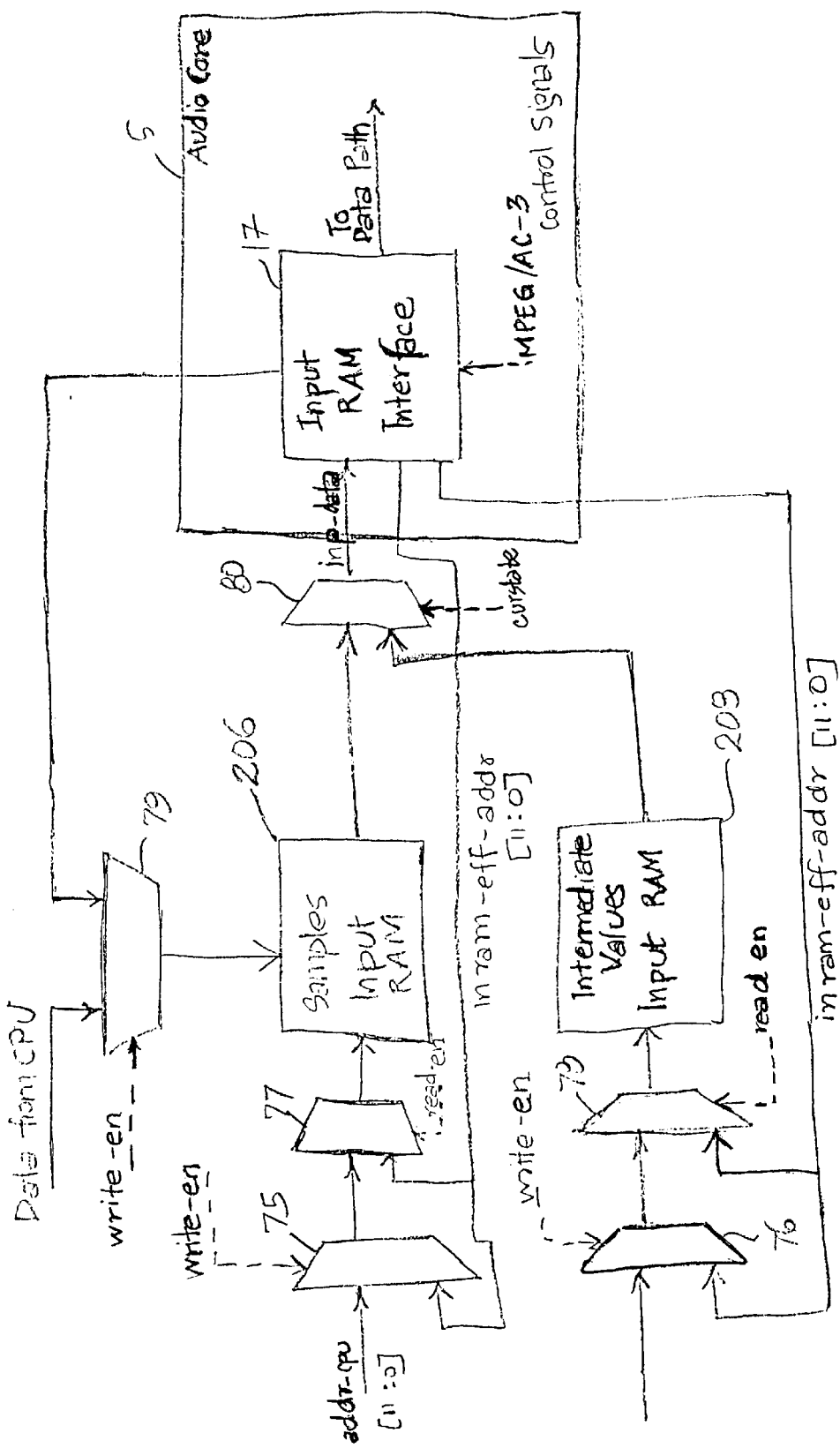
FIG. 7 is a block diagram of the samples and intermediate values input RAM and relevant address and data hardware within and without the audio core.

FIG. 7 shows how input RAM interface 17 of the audio core 5 communicates with the samples input RAM 206, intermediate values input RAM 208 and associated control features lying outside of the audio core. These external features may be implemented as hardware or firmware under the control of a system CPU.

When an appropriate MPEG-2 or AC-3 control signal is received by input RAM interface 17 from control logic block 9, input RAM interface 17 may initially perform two functions. It may generate an address to a location within samples input RAM 206 or intermediate value input RAM 208 and it will provide appropriate signals to the firmware outside of the audio core to specify how data and addresses to samples input RAM 206 are to be arbitrated.

Assuming that data from outside the audio core (e.g., sub-band samples in the incoming bit stream) are to be written to samples input RAM 206, the audio core will control the process as follows. First, in response to appropriate information from control logic block 9, audio core will provide a deasserted write enable signal to a multiplexer 75. This directs multiplexer 75 to pass only the addresses generated by a system CPU. Those addresses will then also be passed by a multiplexer 77 so long as the read enable signal from audio core 5 is also deasserted. The CPU generated address is then provided to samples input RAM 206 and data is written from a source outside the audio core. Specifically, data from an encoded bitstream passed through a multiplexer 79 to samples input RAM 206 at the address specified.

Now suppose that all 32 sub-band samples for each channel being decoded have been written from the input bit stream to the samples input RAM 206. At that point, the samples may be serially read in to the audio core 5 by input RAM 17. To accomplish this, input RAM interface 17 generates an appropriate address in response to the current MPEG-2 or AC-3 control signals, and, in addition, provides an active read enable signal to multiplexer 77. The effective input RAM address signal generated by input RAM interface 17 is provided to multiplexers 75 and 77. Under these conditions, multiplexer 77 will receive two different addresses one specified by the input RAM interface and the other specified by the logic outside of the audio core.

Because the read enable signal is active and the write enable signal is not active, multiplexer 77 will pass the address specified by input RAM interface 17. Thus, that address will be provided to samples input RAM 206 so that data can be read from it from the desired location.

Assume now that the audio core has performed some intermediate processing to generate intermediate values and these values must be written back to appropriate locations in intermediate values input RAM 208. In the case of MPEG processing, these values have been written to partitions 248 or 249 of FIG. 3A. In the case of AC-3 processing, these value will be written back to partitions 240, 241, and/or 242–247 of FIG. 3A. Again, input RAM interface 17 generates an address based upon the current values of certain control signals provided to it. In addition, the audio core provides an active write enable signal and a not active read enable signal to multiplexers 76 and 78. Thus, the effective address generated from input RAM interface 17 is passed through multiplexer 76 and thereafter reaches intermediate values input RAM 208. Further, the data from input RAM interface 17 passes through multiplexer 79 to be written to intermediate values input RAM 208 at the location specified by the current effective address form input RAM interface 17.

M. AC-3 Matrixing and Windowing

Figure 8:
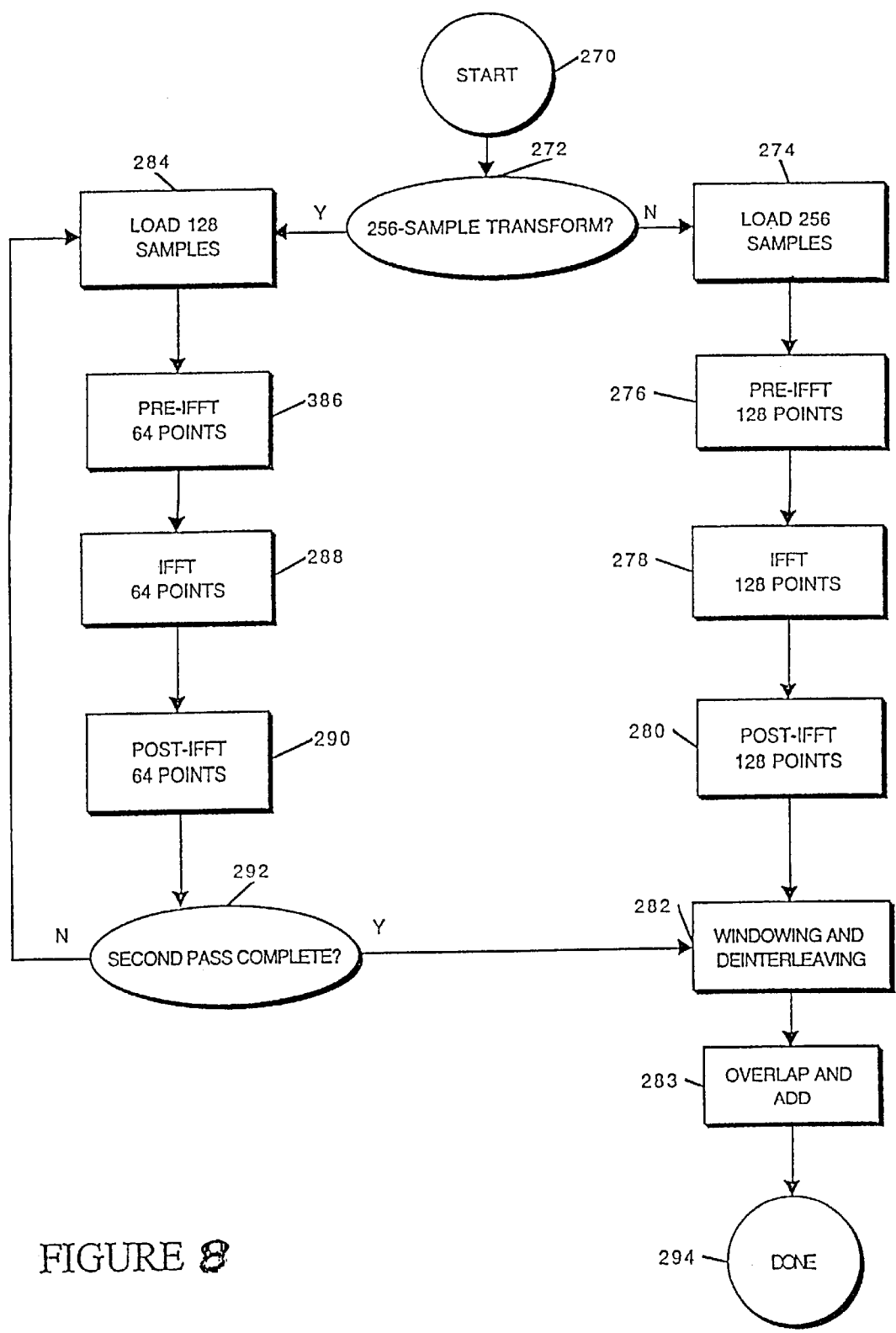
FIG. 8 is a process flow diagram of the principle AC-3 matrixing and windowing steps.

As explained in the AC-3 document, AC-3 data may be encoded in two ways: as a 256-sample transform or as a 512-sample transform. The algorithm for matrixing and windowing AC-3 data treats these two transforms slightly differently as shown in FIG. 8. As shown, the process begins at 270 and then a decision step 272 determines whether the data is to be decoded according to a 256-sample transform. Assuming that the answer to this question is no (i.e., a 512-sample transform is to be employed), the system proceeds to a step 274 where 256 samples are loaded for decoding. If, on the other hand, decision step 272 determines that a 256-sample transform is to be employed, the system proceeds to step 284 where only 128 samples are loaded for processing. Thereafter, three inverse fast fourier transform steps are performed before the system loops back to step 284 where a second 128 samples are loaded and processed. This should be contrasted to the 512-sample transform situation, in which only one pass through the inverse fast fourier transform steps is performed. It should be noted that in either case, 256 values are processed prior to transitioning to a windowing and de-interleaving step 282.

In the case of the 256-sample transform, 256 samples are initially provided to the decoder. On the first pass, 128 even values from these 256 input values are processed by the inverse fast fourier transforms steps. In the second pass, the 128 odd values are similarly processed. In case of the 512-sample transform, all 256 sample values are processed in a single pass.

Focusing now on the 512-sample transform, a step 276 performs a pre-IFFT complex multiplication step after the 256 samples have been loaded at step 274. This process is described at page 73 of the AC-3 document in section 7.9.4.1(2). As described, 128 intermediate values designated as "Z[k]" are generated in this step. Each of those values has a real component (Zr) and an imaginary component (Zi). These values are stored in partition 209 of input RAM 201 or partition 240 of intermediate values input RAM 208. The expression for these values is given as follows:

$Z[k]=Zr[k]+j*Zi[k]$ $Zr[k]=(X[256-2k-1]*(-\cos(2\pi(8k+1)/4096))-X[2k]*(-\sin(2\pi(8k+1)/4096)))$ $Zi[k]=(X[2k]*(-\cos(2\pi(8k+1)/4096))-X[256-2k-1]*(-\sin(2\pi(8k+1)/4096)))$ In the above expressions, k varies from 0 to 127 and X is the input sample value.

The Z[k] values are calculated as follows. A state machine in control logic block 9 provides current state, secondary state and loop count information to input RAM interface 17. Based upon this information, input RAM interface 17 extracts the relevant samples (X) from input RAM 201 (partition 207) or from samples input RAM 206. The input samples values (X) are chosen as required by the above expression for Z[k]. In addition, control logic block 9 provides state information and cycle count information to ROM addressing logic unit 13 which then extracts the appropriate values of the cosine and sine coefficients from the appropriate partition of ROM 15. The sample values extracted by input RAM interface 17 and the coefficient values extracted by ROM addressing logic unit 13 are provided to data path 19 where they are multiplied as required by the above expression.

As each of the Z[k] are generated, they are written to input RAM 201 at partition 209 or to partition 240 of intermediate values input RAM 208. Note that each Z[k] value is stored as two components: a real component Zr and an imaginary component Zi.

After the pre-IFFT step is completed (step 276 of FIG. 8), an IFFT step 278 must be performed. After that step has been completed, according to the AC-3 standard, a post-IFFT step 280 must be performed.

The IFFT step for the 512-sample transform is described in the AC-3 document in section 7.9.4.1(3). As shown there, 128 values of z[n] are generated. These values are generated according to the following expression:

$$z[n]=\Sigma((Zr[k]+j*Zi[k])*(\cos(\pi kn/64)+j*\sin(\pi kn/64)))$$

In this expression each of the 128 values of z[n] are obtained by summing from k=0 to k=127.

As can be seen, each of the 128 values of z[n] contains a real component and an imaginary component. In the preferred implementation, the real component is calculated first, independently of the imaginary component. Specifically, the real component of each z[n] is generated by accumulating 128 products of Z[k] (retrieved from input partition 209 of RAM 201) and appropriate sine/cosine coefficients (retrieved from partitions 109, 111, and 113 of ROM 15). The Z[k] and coefficient values are multiplied in multiplier 143 of data path 19 and accumulated in accumulator 145 also of data path 19. The resulting real value z[n] is stored in an appropriate location of intermediate values input RAM 208. Thereafter, the imaginary component of z[n] is generated in an analogous manner and stored in another appropriate location of intermediate values input RAM 208.

The next step in the AC-3 audio decoding is the post IFFT step, which is performed on the results of IFFT step, stored in the intermediate values input RAM 208. The AC-3 post-IFFT step for the 512-sample transform is described in section 7.9.4.1(4) of the AC-3 document. As shown there, a complex value y[n] is generated for 128 values of n (n varying from 0 to 127). The expression for the post-IFFT step is a follows:

$$y[n]=yr[n]+j*yi[n]$$

$$yr[n]=zr[n]*(-\cos(\pi(8k+1)/2048))-zi[n]*(-\sin(\pi(8k+1)/2048))$$

$$yi[n]=zi[n]*(-\cos(\pi(8k+1)/2048))+zr[n]*(-\sin(\pi(8k+1)/2048))$$

In the preferred implementation of this invention, the real and imaginary components of each of value of z[n] are multiplied with the appropriate cosine/sine coefficients from ROM 15 (by multiplier 143) in the post-IFFT step. The resulting real and imaginary components of y[n] are then written back to input RAM 201 (partition 211) or partition 241 of intermediate values input RAM 208. Writing the values of y[n] to the appropriate addressing with a input RAM 201 or intermediate values input RAM 208 is controlled by input RAM interface 17.

After the post-IFFT step 280 has been performed (i.e., all 128 values of z[n] have been calculated and written to partition 211 or partition 241 of intermediate values input RAM 208), the AC-3 standard requires that two additional steps be performed before the process is completed. Specifically, a windowing/deinterleaving step 282 followed by an overlap and add step 283 must be performed before the process is completed at 294. These steps are described in sections 7.9.4.1.(5) and (6), respectively, of the AC-3 document. In a preferred implementation of the present invention, these distinct steps are combined in to a single step to improve efficiency of the audio core.

As specified in AC-3 document, the windowing and deinterleaving step generates eight values of "x" for each value of n, with n varying from 0 to 63. The expressions for x are as follows:

$$x[2n]=-yi[64+n]*w[2n]$$

$$x[2n+1]=yr[64-n-1]*w[2n+1]$$

$$x[64+2n]=-yr[n]*w[64+2n]$$

$$x[64+2n+1]=yi[64-n-1]*w[64+2n+1]$$

$$x[128+2n]=-yr[32+n]*w[128-2n-1]$$

$$x[128+2n+1]=yi[32-n-1]*w[128-2n-2]$$

$$x[192+2n]=yi[n]*w[64-2n-1]$$

$$x[192+2n+1]=-yr[64-n-1]*w[64-2n-2]$$

In the above expressions, yr[n] is the real component of y[n], yi[n] is the imaginary component of y[n], and w[n] is a windowing coefficient (stored in partition 105 of ROM 15) and specified in Table 7-33 at 77 of the AC-3 document.

While the AC-3 standard indicates 512 values of x (eight values of x generated for each of 64 values of n) be generated in the windowing and de-interleaving step before proceeding to the overlap and add step, a preferred implementation of the present invention combines all these steps.

According to the AC-3 Document (section 7.9.4.1 (6)), the overlap and add step generates 256 pulse code modulation (PCM) values and 128 delay values according to the following expressions:

$$PCM[n]=2(x[n]+delay[n])$$

$$delay[n]=x[256+n]$$

The delay value is provided from the previous calculation of 256 PCM values (i.e., the PCM values calculated from the previous set of 256 samples loaded into partition 207 or input RAM 201 or partitions 242–247 of intermediate values input RAM 208). Thus, the delay value calculated from the above expression is stored for use only when the audio core processes the next 256 input samples.

It has been found that the above expression for PCM values is in error, and the appropriate expression for the PCM values is actually the following:

pcm[2n]=2*((−*yi*[n]**w*[2n])+(delay[n]**w*[*N*/2−2n−1]))

pcm[2n+1]=2*((−*yr*[*N*/8−n−1]**w*[2n+1])+(delay[n+1]**w*[*N*/2−2n−2]))

pcm[*N*/4+2n]=2*((=*yr*1[n]**w*[*N*/4+2n]+(delay[*N*/4+n]**w*[*N*/4−2n−1]))

pcm[*N*/4+2n+1]=2*((*yi*1[*N*/8−n−1]* *w*[*N*/4+2n+1])+(delay [*N*/4+n+1]**w*[*N*/4+n+1]))

As shown, 256 PCM values are generated from the 512×values produced in the windowing and deinterleaving step. The PCM values are written to output RAM 7 (through output RAM interface 16) to conclude the audio core's handling of the AC-3 data. As indicated above, the delay values are loaded into partition 213 of input RAM 201 or partitions 242–247 of intermediate values input RAM 208. As shown in the above expression, these delay values are simply the remaining 128 values of x[n] that were not used to generate the 256 PCM values output in the previous step. Thus, when the decoding process begins, there will be no delay values (i.e., each delay [n] will be equal to 0). Only after the first 256 input samples have been used to generate 256 PCM output samples, will 128 delay [n] values be available for calculation of the next generation of PCM values.

Note that when the delay[n] values are generated, they are written to input RAM 201 at partition 213 or partitions 242–247 of intermediate values input RAM 208 with the aid of input RAM interface 17. Note also that partition 213 and partitions 242–247 must be sufficiently large to store the full complement of delay[n] values for each channel being processed. This is because the delay[n] values must be stored through the whole cycle of IFFT, windowing, and overlap before they can be used. Only at that time are they overwritten with the new values of delay[n].

It should be understood that while the expressions for overlap and add in the AC-3 standard suggest that 256 unique PCM values and 256 unique delay values are generated in the overlap and add step, the audio core implementation of this invention may actually generate 256 unique PCM values but store only 128 delay values, in this step. This is achieved by storing only 128 values of yr2[n] and yi2[n], i.e., store yr2[64], yr2[65], . . . , yr2[127], yi2[64], yi2[65], . . . , yi2[127], as delay values, in partition 213 of input RAM 201 or partitions 242–247 of intermediate values input RAM 208. It should be understood, of course, that each of these stored delay values is used twice in calculating subsequent PCM values. The step of downmixing is also performed in hardware to mix the multi-channel source audio data into the user-specified number of output audio channels.

Implementation of the 256-sample transform is similar to implementation of the 512-sample transform. The main difference is that the original 256 samples loaded into the input RAM are divided into "even" samples and "odd" samples for separate processing. As indicated in section 7.9.4.2(1) of the AC-3 standard, the even samples are designated "X1", and the odd samples are designed "X2". These values are loaded in step 284 of the FIG. 8 process.

While the AC-3 document may suggest that the even and odd samples be processed in separate iterations (as indicated at step 292 of 10), the preferred implementation of the present invention performs each IFFT step for both the even and odd values before proceeding to the next IFFT step.

The pre-IFFT step (step 286 of FIG. 8) of the 256-sample transform is described at section 7.9.4.2(2 ) of the AC-3 standard. As indicated therein, the calculation of Z1[k] (for even values) and Z2[k] (for odd values) employs the same the expression as used to generate Z[k] in the 512-sample transform with the exception of that 64 values of Z1 [k] and 64 values Z2[k] are generated, as opposed to 128 values of Z[k]. The resulting values of Z1[k] and Z2[k] are written back to input RAM 201 as described above in case of the Z[k] values.

IFFT step (step 288 of FIG. 8) and post-IFFT step (step 290 of FIG. 8)—described at section 7.9.4.2(3) and (4) of the AC-3 documents—parallel the corresponding steps for the 512-sample transform. The subsequent windowing and overlap steps are also performed as in the case of the 512-sample transform (see section 7.9.4.2(5) and (6) of the AC-3 document).

Note that the sine and cosine coefficients employed for the pre- and post-IFFT steps is slightly different for the 512-sample and 256-sample transforms and an optimal set of distinct coefficients is stored in the ROM.

N. More Preferred Implementation of the Functionally Partitioned Firmware/Hardware in an Overlapped Manner For AC-3 Decoding In a more preferred embodiment, audio core design shown in FIG. 3 is employed for decoding AC-3 audio data. According to this embodiment, the firmware (CPU) performs steps 178–194 and loads the 256 new samples for pre-IFFT into the samples input RAM 206. The hardware (audio core) begins performing pre-IFFT after it is informed that 256 new samples per channel for pre-IFFT have been loaded into samples input RAM 206 and produces 256 new values for vector V according to the expression shown above. The audio core then writes the 256 new values to Z[k] section 240 of intermediate values input RAM 208. The present invention recognizes that at this point, the values stored in samples input RAM 206 can be overwritten by new sample values for channel 2. It is important to bear in mind that during the pre-IFFT process by the hardware mentioned above, the firmware is idle. After the firmware concludes writing to Z[k] section 240 of intermediate values input RAM 208, however, the firmware in this embodiment proceeds to decode the next 256 samples of audio data for channel 2.

In this embodiment, the functions of the firmware and hardware during the AC-3 decoding process overlap, i.e. the hardware (audio core) and the firmware contribute to decoding simultaneously. Furthermore, the firmware is not idle and begins decoding audio data for a subsequent channel as the hardware concludes decoding audio data for the previous channel. Consequently, the more preferred embodiment of the present invention is able to perform multi-channel AC-3 decoding, within the available decode time per frame of 32 milliseconds and with a low system clock of 27 MHz.

Figure 9:
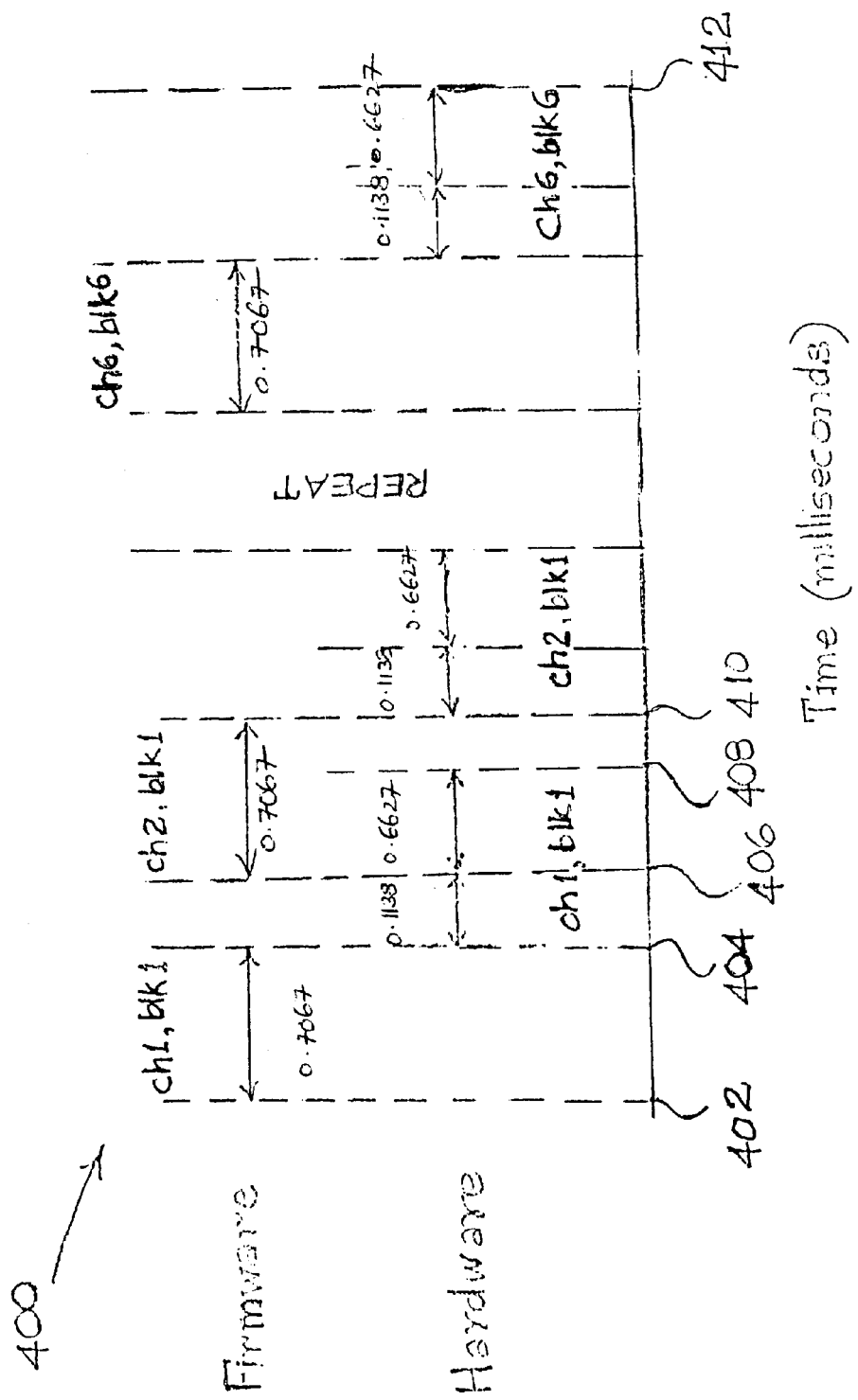
FIG. 9 is a timeline showing when and for how long the firmware and hardware are active during an AC-3 audio data decoding process, according to a more preferred embodiment of the present invention.

FIG. 9 shows a time line of when the partitioned firmware and hardware are active during the AC-3 decoding process, according to a more preferred embodiment of the present invention. At time (t) equals zero, denoted by reference numeral 402, both the firmware and hardware are idle. The decoding process then begins when the firmware (CPU) starts performing steps 178–194 of FIG. 1B, which steps for an audio frame (including 6 blocks and each block containing 6 channels) may take about 25.442 milliseconds for a low system clock of about 27 MHz. On a per channel basis, the total time consumed by the firmware to perform steps 178–194 may be about 0.7067 milliseconds. Referring back to FIG. 9, therefore, when time (t) equals about 0.7067 milliseconds, denoted by reference numeral 404, the firmware writes 256 samples of channel 1 to samples input RAM 206 (shown in FIGS. 3 and 3A) and goes into idle mode.

At this point, the hardware (ACORE) begins step 196 of FIG. 1B (pre-IFFT) to produce 256 new values for the IFFT step described above. After 0.1138 milliseconds have elapsed, denoted by reference numeral 406 in FIG. 9, ACORE completes pre-IFFT and writes the 256 new values of channel 1 to Z[k] section 240 in intermediate values input RAM 208 of FIG. 3A. At this point, both the hardware and the firmware contribute to the decoding process. The hardware proceeds to performing IFFT, post-IFFT, windowing and downmixing on the samples and the firmware retrieves the next 256 samples of channel 2 to commence decoding, as described for 256 samples of channel 1. After another 0.6627 milliseconds have elapsed (denoted by reference numeral 408 in FIG. 9), the hardware finishes decoding the AC-3 encoded audio data, writes the output to output RAM 7 and waits for the firmware to finish processing the 256 samples for channel 2. As mentioned above, the firmware takes about 0.7067 milliseconds to complete steps 178–194 and at reference numeral 410 in FIG. 5, these steps performed by the firmware are completed. In this manner, decoding of a single audio frame concludes when 256 samples for the sixth channel are completed at reference numeral 412 in FIG. 9.

Thus, according to one embodiment of the present invention, the time consumed to decode an audio frame of six channels and six blocks takes about ((0.7067)+(0.7765*36)+(0.0440*35))=30.2007 milliseconds, which is less than the available time of 32 milliseconds for a low system clock of about 27 MHz. Thus, the firmware and hardware partitioning of the decoding tasks in the present invention with a fully pipelined and (firmware and hardware) overlapped implementation helps in achieving multi-channel audio decoding and reconstruction within the available decode time operation with a low system clock of about 27 MHz to a high system clock, e.g., about 108 MHz.

O. Overall Process Flow for the Audio Core

Figure 10:
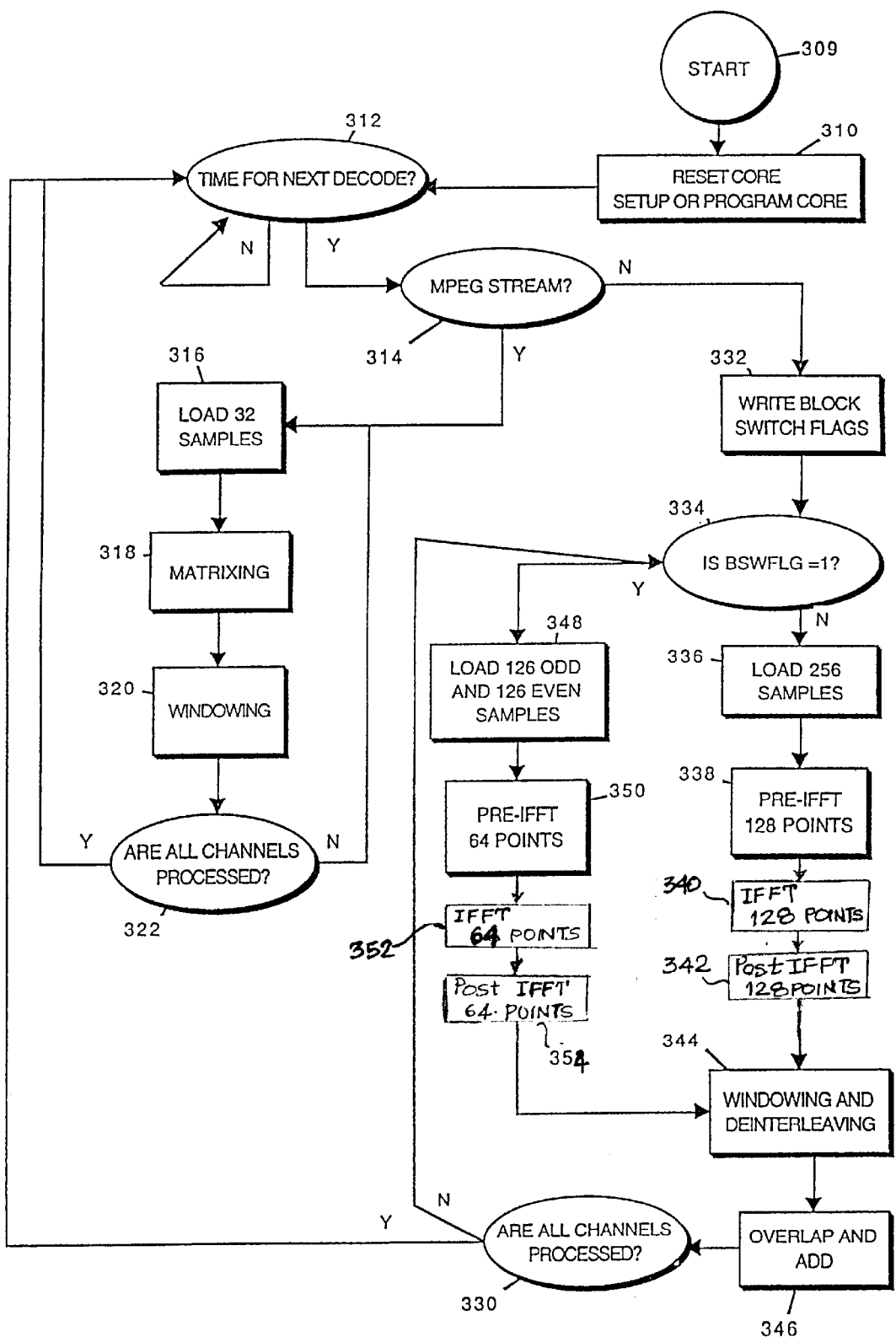
FIG. 10 is a process flow diagram showing the primary steps undertaken by the audio core to perform MPEG and AC-3 decoding.

The process steps employed by the audio core to decode MPEG or AC-3 data are presented as process flow 308 in FIG. 10. Process 308 begins at 309 and proceeds to a step 310 where the audio core is reset, setup or programmed. This step specifies such information as the number of channels being decoded, whether the data is encoded in accordance with the AC-3 or MPEG standard, etc. Such information is provided to the audio core registers from the bitstream. Next, at a step 312, the audio core determines whether it is time to begin the next decoding cycle. The new decoding cycle begins every time 32 samples per channel have been processed for MPEG data or 256-samples per channel have been decoded for AC-3 decoding. If it is not yet time for the next decode cycle, the process does not proceed beyond process step 312.

Assuming that it is now time for the next decode cycle, a process 314 determines whether the input bit stream is an MPEG stream. If so, 32 samples per channel are loaded from outside the core to input RAM 201 at a step 316. Thereafter, those samples are matrixed at a step 318. As described above, the matrixing performed within the audio core of this invention actually subsumes three MPEG process steps: shifting, matrixing, and building vector V. Next, a windowing step 320 is performed to compute and output 32 PCM samples. As explained above, this windowing step actually combines the windowing and PCM calculation steps required by the MPEG standard.

At this point, a process step 322 determines whether all channels of encoded MPEG data have yet been decoded. If not, process control returns to step 316 where 32 samples for the next channel are loaded for use by the audio core. MPEG decoding proceeds as before to generate 32 new PCM samples for the current channel. After all channels have been decoded, and decision step 322 is therefore answered in the affirmative, process control returns to decision step 312 where the audio core determines whether the it is time for the next decoding cycle.

If decision step 314 determines that the incoming bit stream is actually an AC-3 stream (as opposed to an MPEG stream), the process moves to a process step 332 where the block switch flags are written to the audio core. Thereafter, a decision step 334 determines whether the block switch flag for the current channel is set equal to 1. If not, the incoming AC-3 data is encoded according to the 512-sample transform. The process control thus turns to a step 336 where 256 samples are loaded for processing. Thereafter, the pre-IFFT step is performed at a step 338.

Next, the IFFT and post-IFFT steps are performed in steps 340 and 342 as described above. The resulting values are written back to input RAM 201. From this point the process proceeds to step 344 where the windowing and deinterleaving steps are performed as described above. From there, the overlap and add steps are performed at step 346. This concludes the data manipulation by the audio core for the AC-3 data.

The audio core now determines whether all channels of AC-3 data have been decoded for the current decoding cycle at a decision step 330. If not, process control returns to decision step 334 which checks the block switch flag setting for the new channel. Assuming that it is still set equal to 0, the audio core processes the samples as described above with respect to steps 336, 338, 340, 342, 344, and 346.

If, however, the block switch flag is set equal to 1, a process step 348 loads 128 odd samples and 128 even samples (from the 256 total samples) for processing in accordance with the 256-sample transform. After all of the odd and even samples have been loaded at 348, the audio core performs the pre-IFFT processing on both the odd and even samples at a step 350. Next, a process step 352 performs the IFFT and process step 354 performs the post-IFFT decoding steps on the intermediate values generated from step 350. From there, windowing and deinterleaving are performed at step 344 as described above, and the process proceeds from there as described above.

P. Conclusion

Although the foregoing invention has been described in some detail for purposes of clarity of understanding, it will be apparent that certain changes and modifications may be practiced within the scope of the appended claims. For example, while the audio decoder core of this invention preferably implements specific functions in accordance the MPEG-1, MPEG-2, and AC-3 standards, there is in principal no reason why the audio cores of this invention can not be employed with other audio decoding algorithms which do not necessarily adhere to the MPEG-1, MPEG-2, or AC-3 protocols. Therefore, the present embodiments are to be considered as illustrative and not restrictive, and the invention is not to be limited to the details given herein, but may be modified within the scope of the appended claims.

What is claimed is:

1. A digital audio decoder comprising:
    a processor controlled by firmware instructions for performing decoding computations on a plurality of MPEG and AC-3 digital audio channels to generate a number of discrete samples; and a dedicated hardware module configured to perform sub-band synthesis and windowing computations on said discrete samples for decoding said MPEG and AC-3 digital audio signals, wherein said processor controlled by said firmware and said hardware are each configured to simultaneously perform decoding computations on at least one of said plurality of MPEG and AC-3 channels.

2. The digital audio decoder of claim 1, wherein said processor and said hardware are coupled by an input RAM.

3. The digital audio decoder of claim 2, wherein the input RAM includes a samples input RAM and an intermediate values input RAM, which is segregated from said samples input RAM.

4. The digital audio decoder of claim 3, wherein the samples input RAM and the intermediate values input RAM are located outside of the audio core.

5. The digital audio decoder of claim 3, wherein an input RAM interface controls reading of samples from the samples input RAM and controls writing intermediate values generated during the sub-band synthesis to the intermediate values input RAM.

6. The digital audio decoder of claim 3, wherein the intermediate values input RAM includes one or more partitions to store intermediate values for the sub-band synthesis during decoding MPEG and AC-3 digital audio signals.

7. The digital audio decoder of claim 2, wherein the input RAM is configured to store intermediate values that are calculated by said dedicated hardware module during sub-band synthesis and written back to said input RAM.

8. The digital audio decoder of claim 1, wherein an input RAM interface controls reading of said discrete samples from an input data partition of an input RAM, reading intermediate values from the input RAM and writing of intermediate values generated during said sub-band synthesis to one or more intermediate partitions of the input RAM.

9. The digital audio decoder of claim 8, wherein the input RAM interface also controls reading intermediate values from the input RAM.

10. The digital audio decoder of claim wherein the input data partition for MPEG decoding is provided in a first location of the input RAM, the input data partition for AC-3 decoding is provided in a second location of the input RAMS the one or more intermediate partitions for MPEG decoding is provided in a third location of the input RAM, and the one or more partitions for AC-3 decoding is provided in a fourth location of the input RAM.

11. The digital audio decoder of claim 8, wherein at least one of the one or more intermediate partitions of the input RAM stores intermediate values for said sub-band synthesis during decoding MPEG and AC-3 digital audio signals.

12. A digital audio decoder comprising:
means for controlling a processor to perform decoding computations on a plurality of MPEG and AC-3 digital audio channels for generating a number of discrete samples, wherein said controlling means is stored in firmware; and
means for performing sub-band synthesis and windowing during decoding of MPEG and AC-3 digital audio signals, said performing means implemented as a dedicated hardware module, wherein said controlling means and said hardware are each configured to simultaneously perform decoding computations on at least one of said plurality of MPEG and AC-3 channels.

13. The digital audio decoder of claim 12, further comprising:

means for storing configured to store intermediate values that are calculated by said means for performing sub-band synthesis.

14. A process of decoding MPEG and AC-3 digital audio channels, comprising:
providing a digital audio decoder including firmware and a dedicated hardware module that are each configured to perform distinct computations to decode MPEG or AC-3 digital audio signals;
receiving MPEG or AC-3 encoded digital audio signals;
decoding at least partially said digital audio signals using said firmware to perform MPEG or AC-3 audio decoding computations that precede sub-band synthesis and windowing; and
performing said sub-band synthesis and said windowing on said at least partially.decoded MPEG or AC-3 digital audio signals using said dedicated hardware module, wherein said decoding step using said firmware and said performing step using said dedicated hardware are done simultaneously to decode at least one of said MPEG and AC-3 channels.

15. The process of claim 14 further comprising:
controlling an operation of a CPU with said firmware; and
defining an audio core with said hardware.

16. The process of claim 14, wherein decoding using MPEG audio computations that precede the sub-band synthesis and windowing include the steps of decoding, bit allocation, decoding of scale factors and requantizationing.

17. The process of claim 14, wherein decoding using AC-3 audio computations that precede the sub-band synthesis and the windowing include the steps of providing a bit stream to an audio decoder, synchronizing the bit stream, unpacking BSI and side information, decoding exponents for a current group of samples, bit allocation within the bit stream, unpacking, ungrouping, dequantizing and dithering mantissas, decoupling, rematrixing and dynamic range compression.

18. The process of claim 14, further comprising after said decoding at least partially said digital audio signals by said firmware, writing values produced as a result of said decoding by the firmware to a samples input RAM.

19. The process of claim 14, further comprising
performing downmixing and pulse code modulation by the hardware to produce an output; and
writing said output produced by the hardware to an output RAM.

20. The process of claim 14, further comprising:
signaling said hardware to begin performing the sub-band synthesis and the windowing on said at least partially decoded digital audio signals for a first channel, when said firmware concludes writing values for the first channel to a samples input RAM.

21. The process of claim 20, further comprising signaling said firmware to begin decoding at least partially decoded audio data for a second channel using MPEG or AC-3 audio computation that precede the sub-band synthesis and the windowing, when said hardware consumes said values for the first channel in said. input RAM to compute a first set of intermediate values and completes writing said first set of intermediate values to an intermediate values input RAM.

* * * * *